Figure 1:
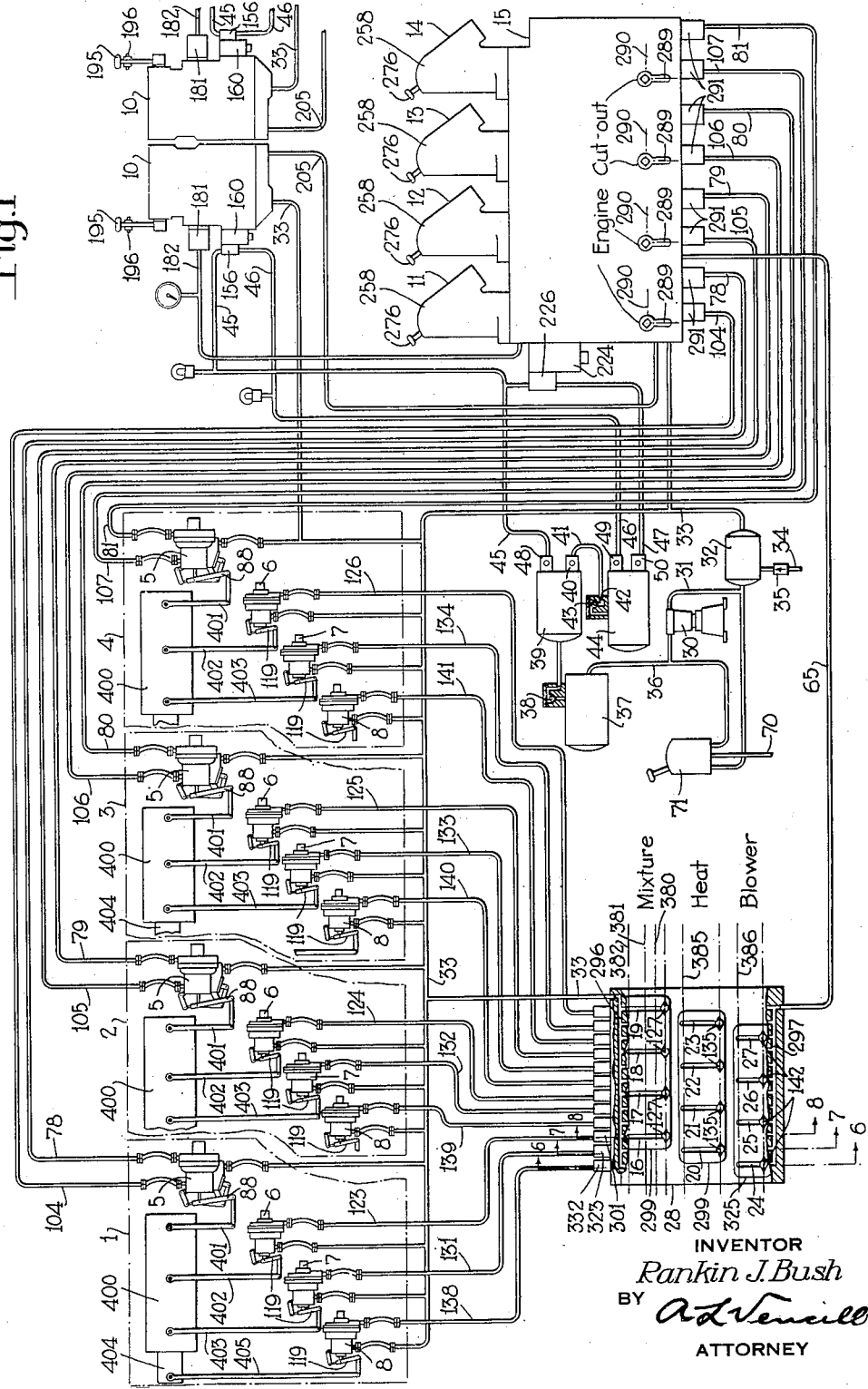

Sept. 20, 1949.    R. J. BUSH    2,482,244
FLUID PRESSURE CONTROL APPARATUS
Filed March 23, 1943    5 Sheets-Sheet 2

INVENTOR
*Rankin J. Bush*
BY *A L Vencill*
ATTORNEY

Sept. 20, 1949.  R. J. BUSH  2,482,244
FLUID PRESSURE CONTROL APPARATUS
Filed March 23, 1943  5 Sheets-Sheet 3

INVENTOR
*Rankin J. Bush*
BY
ATTORNEY

Sept. 20, 1949.  R. J. BUSH  2,482,244
FLUID PRESSURE CONTROL APPARATUS
Filed March 23, 1943  5 Sheets-Sheet 4
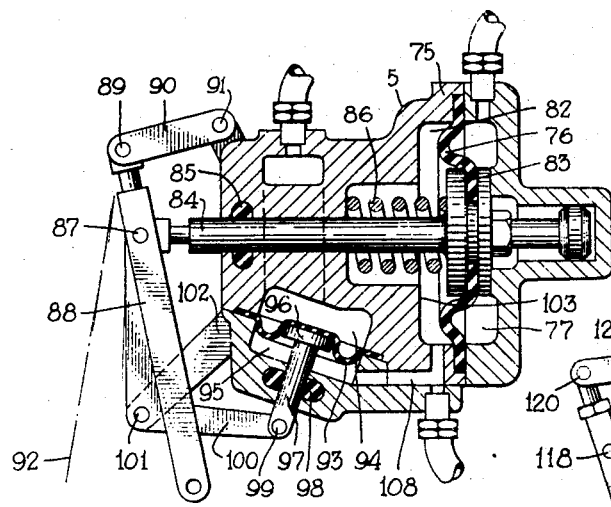
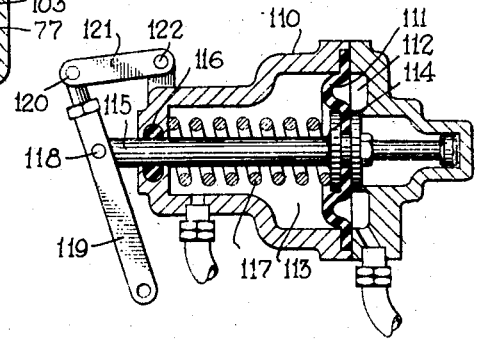
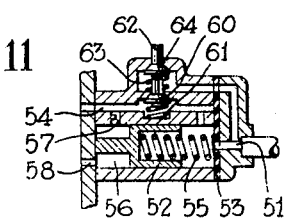
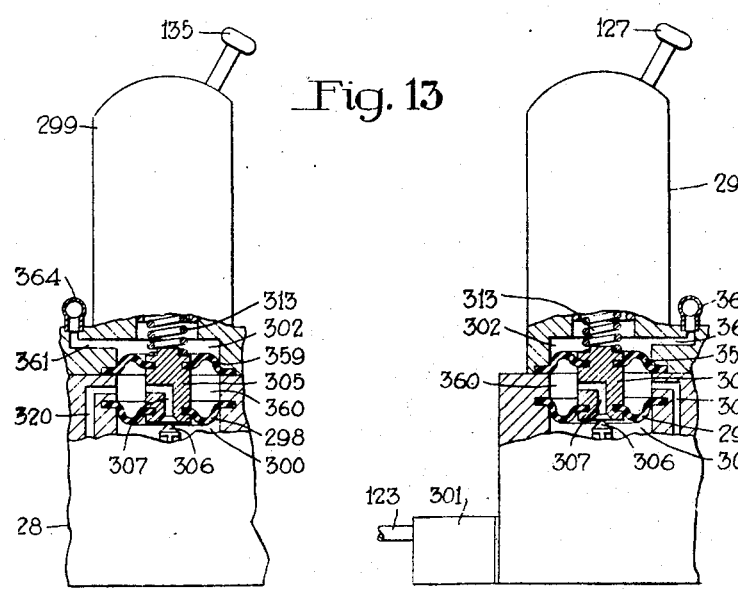
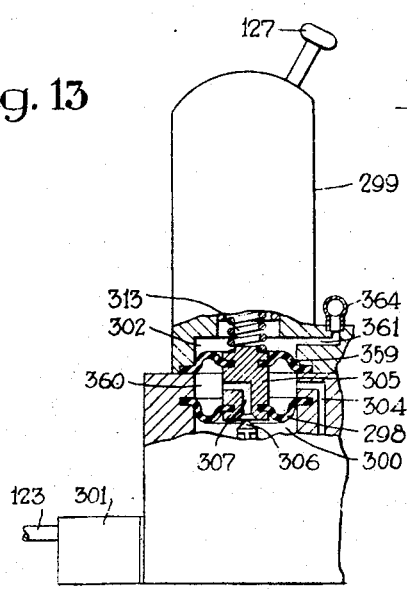
INVENTOR
*Rankin J. Bush*
BY
*A. L. Vencill*
ATTORNEY

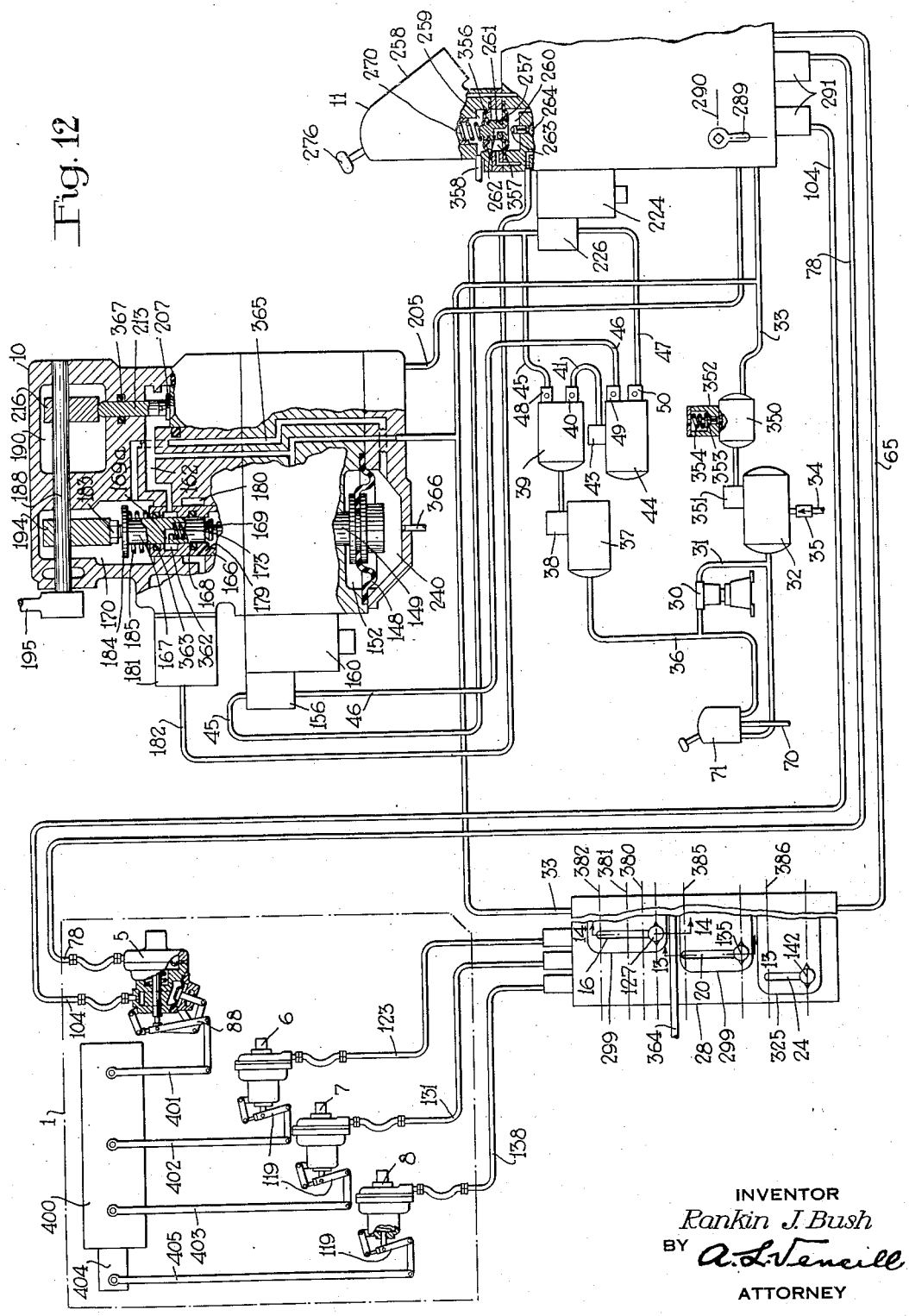

Patented Sept. 20, 1949

2,482,244

UNITED STATES PATENT OFFICE 2,482,244

FLUID PRESSURE CONTROL APPARATUS

Rankin J. Bush, Jeannette, Pa., assignor to The Westinghouse Air Brake Company, Wilmerding, Pa., a corporation of Pennsylvania Application March 23, 1943, Serial No. 480,161

30 Claims. (Cl. 60—97)

This invention relates to control apparatus and more particularly to the fluid pressure type for selectively controlling a plurality of different operations or devices.

Certain large airplanes provided with a plurality or bank of internal combustion propelling engines at either side of the fuselage require, in addition to the pilot who controls the speed of both banks of engines during flight, an engineer for constantly watching the operation of each individual engine through the medium of gages or the like and for making such adjustments as may be required to provide desired and efficient operation of the engines under different flight conditions. At the discretion of the pilot, or in case of emergency, the engineer should be capable of controlling the engines during flight and also when not in flight, as during warming up periods or for the purpose of taxiing the plane. Moreover, if during flight, trouble of any kind should develop in an engine, the engineer should be able to cut the engine out of control by the pilot for repair or the like and then if desired subsequently transfer such control back to the pilot.

One object of the invention is therefore the provision of a fluid pressure system for controlling a plurality of prime movers, such as internal combustion engines, from either of two control stations, such as the pilot's and engineer's compartments or stations, in an airplane.

Another object of the invention is the provision of a fluid pressure control system for a plurality or bank of internal combustion engines providing, at all times, for control by the engineer of certain controlling devices for each individual engine, such as a supercharger and of means governing the fuel mixture to and the temperature of such mixture for said engine, and also providing for control of the speed of the engines individually by the engineer, or of the bank of engines, as a unit, by the pilot.

Another object of the invention is the provision of a control system such as defined in the preceding objects whereby the pilot can, at will, take over the control of the speed of all engines regardless of the enginer, if all engines are working, and may, at will, return such control to the engineer.

The proposed pilot's control of speed of a bank of engines provides for simultaneous and like adjustments of the speed of all engines in the bank. Due to slight differences which however may exist in different parts of each engine and the adjustment thereof and/or of controlling devices therefor, or in the pitch of the propeller driven by the engine, such simultaneous control of all engines in the bank may not provide identical operation, such as speed or output of all engines.

Another object of the invention is therefore the provision of means controlled by the engineer for synchronizing the operation or equalizing the output of each engine in a bank with all other engines in the bank while the speed of all of the engines is under the control of the pilot.

Another object of the invention is the provision of means whereby in case of difficulty with any individual engine, the engineer may cut said engine out of control by the pilot for correcting the difficulty, and then, if desired, return the control of said engine to the pilot.

Another object of the invention is the provision of a fluid pressure control system, such as defined in any of the above objects, which is so constructed and arranged as to insure substantially the same and trouble free operation of the engines at all altitudes and under all atmospheric conditions.

Another object of the invention is the provision of a fluid pressure control system as above defined so arranged that the failure of any one control pipe will have no effect upon other parts of the system, thus the failure of a pipe which might possibly result in failure of one engine, will have no effect upon operation of any other engine.

Another object of the invention is the provision of a fluid pressure control system such as above defined which embodies a plurality of sources of fluid under pressure in order to insure desired control of the plane in case of failure of one or another of said sources.

Figure 2:
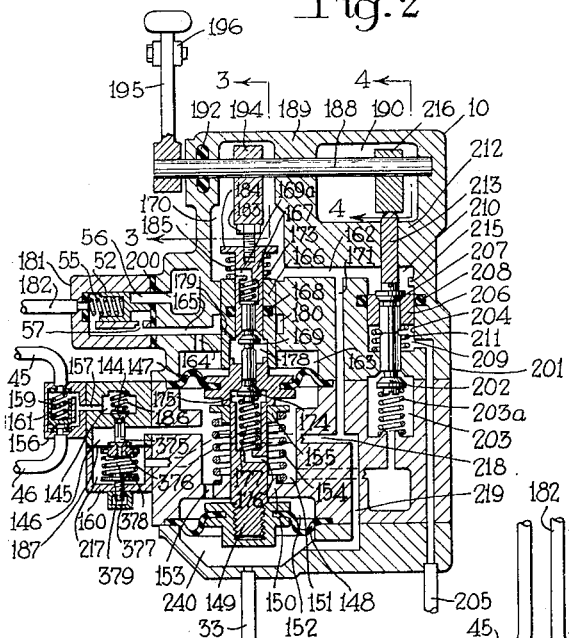
Figure 5:
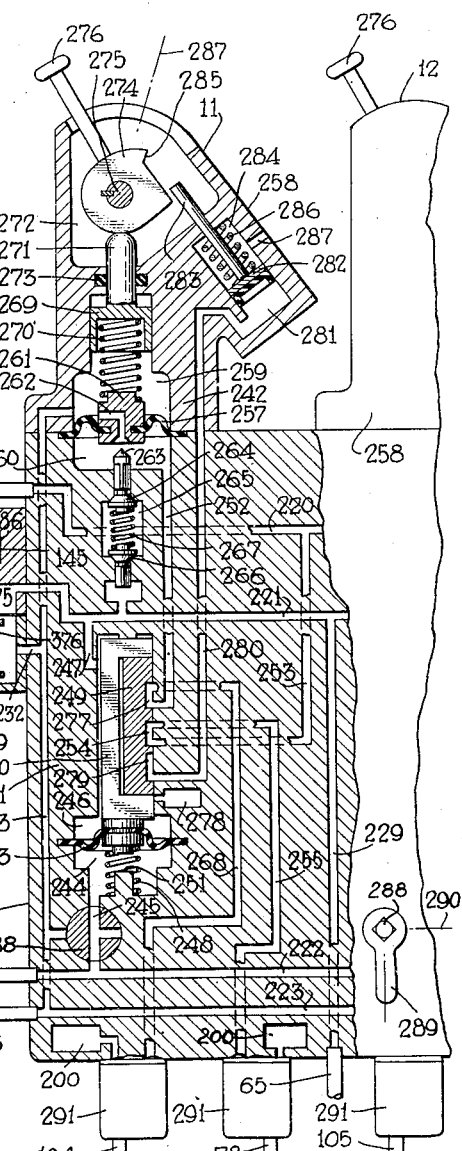
Figure 4:
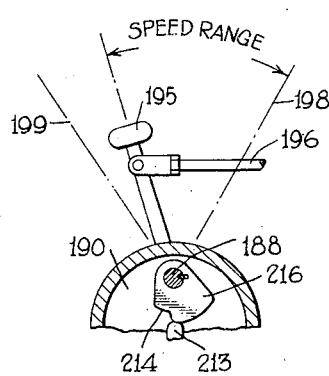
Figure 3:
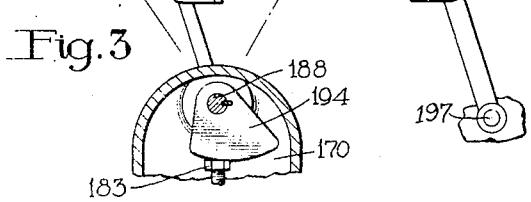
Figure 6:
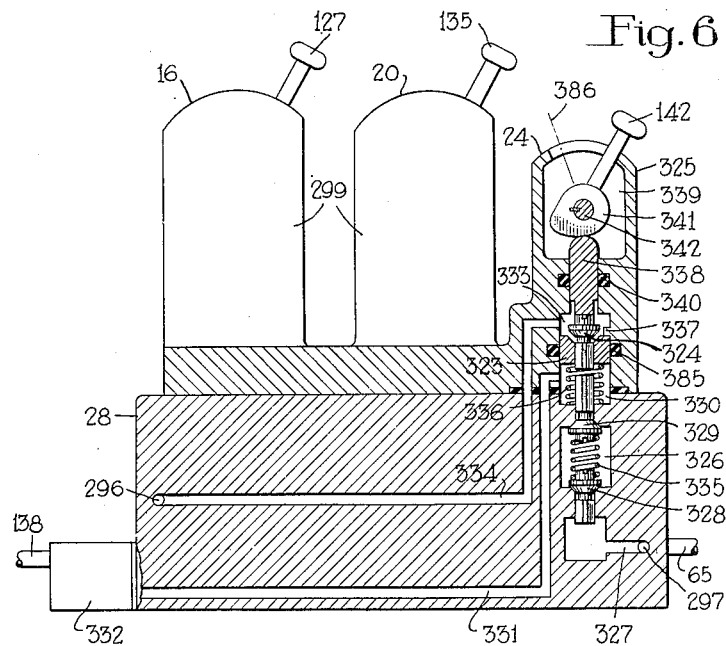
Figure 8:
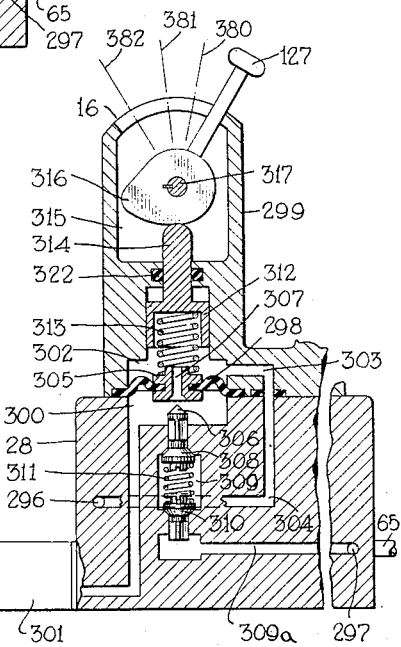
Figure 7:
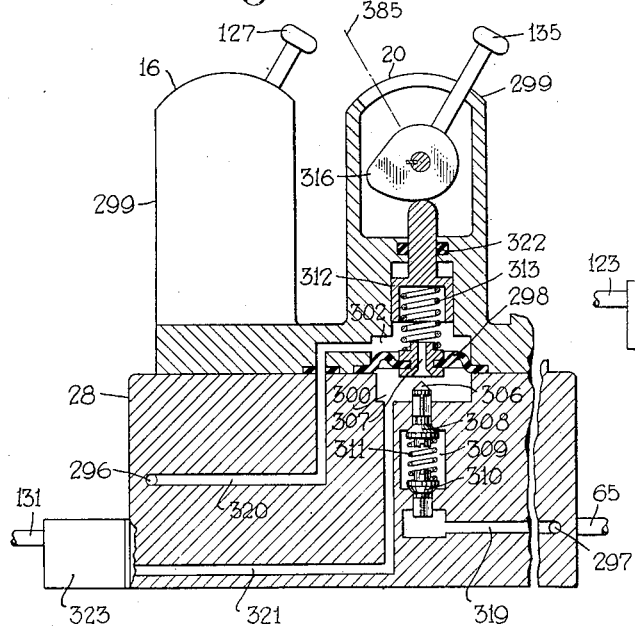

Other objects and advantages will be apparent from the following more detailed description of the invention:

In the accompanying drawings; Fig. 1 is a diagrammatic view, mainly in outline, of one form of fluid pressure control system constructed in accordance with the invention; Fig. 2 is a vertical sectional view of a pilot's speed control valve device shown in elevation in Fig. 1; Figs. 3 and 4 are sectional views taken on the lines 3—3 and 4—4, respectively, in Fig. 2; Fig. 5 is a vertical sectional view of a portion of an engineer's speed control valve device arranged to control the speed of one engine and shown in elevation in Fig. 1; Figs. 6, 7, and 8 are vertical sectional views taken on lines 6—6, 7—7, and 8—8, respectively, of an engineer's control valve device shown in elevation in Fig. 1; Figs. 9, 10 and 11 are sectional views of certain devices shown in elevation in Fig. 1; Fig. 12 is a diagrammatic view, partly in section and partly in outline, of a modified form of control system embodying the invention; and Fig. 13 and 14 are sectional views taken on lines 13—13 and 14—14, respectively, in Fig. 12.

*Description*

The invention will hereinafter be described as for controlling the speed or output of one or more prime movers such as internal combustion engines and the adjustment of certain controlling devices for each engine, as applied to an airplane, but it is not intended that the invention be so limited, since from the following description it will be apparent that the system may, if desired, be equally well used for controlling the operation of one or more engines employed for purposes other than propelling an airplane.

As shown in Fig. 1 of the drawings, the dot and dash enclosures designated by reference numerals 1 to 4 indicate four internal combustion engines constituting one bank of engines intended to be located at one side of the fuselage of the plane. A like bank of engines will be located at the opposite side of the plane's fuselage. The number of engines in each bank is immaterial to the invention since it is applicable to any desired number, four being chosen merely for illustrative purposes. The fluid pressure control system shown in the drawings therefore provides for the control of only one bank of four engines, although it may be arranged to control a greater or lesser number of engines if desired. A duplicate control system would be provided for the bank of engines at the opposite side of the fuselage, but neither are shown in the drawings since they are not essential to a clear understanding of the invention.

Each of the engines 1 to 4 inclusive is provided with a fuel control device 400 having levers 401, 402 and 403 which are operative, respectively, to control the amount of fuel mixture supplied to the engine, the richness or leanness of said mixture and the temperature of said mixture. Each engine is also provided with a blower or supercharger 404 for driving the fuel mixture into the cylinders of the engine, a lever 405 being provided for controlling the operation of said blower. The proper adjustment of all of these levers is required to obtain desired operation of the individual engines, and which operation may vary according to different operating conditions of the airplane.

For adjusting the levers 401, 402, 403 and 405, there is associated with each engine four fluid pressure controlled regulating devices 5, 6, 7, and 8 respectively, to which said levers are operatively connected. The devices 5 may be named speed regulating devices and are arranged to be controlled by either the pilot or the engineer of the airplane. The regulating devices 6, 7, and 8 are arranged for control only by the engineer and may be named, respectively, mixture regulating devices, temperature regulating devices and blower or supercharger regulating devices.

All of the speed regulating devices 5 associated with the one bank of engines are arranged to be controlled, as a unit, i. e., simultaneously by means of a pilot's speed control valve device 10 located at the pilot's control station in the plane. In Fig. 1, two of the devices 10 are shown arranged side by side, this arrangement constituting the pilot's control for the two banks of engines located at opposite sides of the fuselage.

The speed regulating devices 5 associated with the engines 1 to 4 inclusive are also arranged to be individually controlled by the engineer's speed control valve devices 11, 12, 13, and 14, respectively, located at the engineer's control station in the plane. The control valve devices 11 to 14 are identical to each other and are preferably built as a unit or with a common housing 15 to minimize the number of pipes in the system and thus the possibility of loss of control due to pipe breakage.

The reference numerals 16, 17, 18, and 19 indicate four engineer's fuel mixture control valve devices for controlling the mixture regulating devices 6 for the four engines 1 to 4, respectively. The reference numerals 20, 21, 22, and 23 indicate four engineer's temperature or heat control valve devices for controlling the temperature regulating devices 7 for the engines 1 to 4, respectively, while the reference numerals 24, 25, 26, and 27 indicate four blower control valve devices for controlling the regulating devices 8 for the engines 1 to 4 respectively. The several control devices 16 to 27 are also preferably built with a common housing, indicated in Fig. 1 by reference numeral 28 to minimize the use of piping.

It will now be noted that the pilot is provided with the single control device 10 for governing, as a unit, the speed of all engines 1 to 4, while the engineer is provided with separate control devices for each individual engine for controlling its speed, the richness or leanness of the fuel mixture, the temperature of said mixture, and the operation of the supercharger or blower. A more detailed description of these control devices and their manner of control will follow.

*Description of fluid pressure supply system*

Fluid under pressure for controlling the operation of the several devices 5 to 8 associated with the engines 1 to 4, inclusive, in either or both banks of engines, and, if desired, for also controlling any other fluid pressure responsive apparatus on the airplane is arranged to be provided by one or more fluid compressors 30 which may be driven by any suitable means such as said engines. The compressor 30 has an intake pipe 31 leading from a so-called sump reservoir 32 which, as will be later described, is arranged to receive, through a return pipe 33, fluid under pressure which has been used for operating the devices 5 to 8 or other apparatus. The sump reservoir 32 is also provided with an intake pipe 34 leading from the atmosphere and containing a check valve 35 arranged to prevent flow of fluid under pressure from the reservoir to the atmosphere.

Fluid under pressure discharged by the compressor 30 flows through a discharge pipe 36 to a main storage reservoir 37 and from thence past a check valve 38 to a second storage or auxiliary reservoir 39. From the reservoir 39 fluid under pressure flows through a cut-off valve device 40, a pipe 41, a choke 42, and then past a check valve 43 to an emergency reservoir 44, thus all of the reservoirs 37, 39, and 44 may become charged with fluid at the same pressure which may be of a relatively high degree such as 400 pounds per square inch.

The choke 42 is provided to restrict the outflow of fluid under pressure from the auxiliary reservoir 39 for charging the emergency reservoir 44, in order to more quickly obtain in the former an adequate degree of fluid pressure for controlling the operation of the devices 5 to 8 upon initial charging of the system, which will hereinafter be more fully described.

The auxiliary reservoir 39 and emergency reservoir 44 constitute two separate sources of fluid under pressure for controlling the operation of the devices 5 to 8 associated with engines 1 to 4 as will be more fully described later, and to this end the auxiliary reservoir 39 is provided with a fluid pressure supply pipe 45 leading to the pilot's control valve device 10 and to the body 15 of the engineer's control valve devices 11 to 14, while the emergency reservoir 44 is provided with two independent fluid pressure supply pipes 46 and 47 leading respectively to the pilot's control valve device 10 and to body 15 of the engineer's control valve devices 11 to 14. Cut-off valve devices 48, 49, and 50 are secured to the reservoirs 39 and 44 in the connections between said reservoirs and the pipes 45, 46, and 47, respectively.

The cut-off valve devices 40, 48, 49, and 50 may be of identical structure comprising, as shown in Fig. 11, a body arranged to be secured to the respective reservoir and containing a valve piston 52 one end of which is arranged to seat against a gasket 53 for closing communication between a passage 54 open to the interior of the reservoir and an outlet passage 51 open to the respective pipe 41, 45, 46, or 47. A spring 55 acts on the one end of valve piston 52 urging same to its normal or open position shown, in which fluid under pressure may flow from the reservoir past the valve piston to the respective pipe. The opposite end of valve piston 52 is subject to pressure of fluid in a chamber 56 which is connected through a restricted port 57 to passage 54 and also through a passage 58 to the interior of the reservoir. In the present structure the restricted port 57 serves no useful pupose but is required in structures to be later described.

With the valve piston 52 in the open position shown, in which it will be maintained by spring 55 when the pressure of fluid in the outlet passage 51 is within a certain degree of that in the reservoir, fluid under pressure will freely flow from said reservoir to said passage and thence to the respective pipe. A certain reduction in pressure on the spring engaged end of the valve piston 52, as in case of rupture of pipe 41, 45, 46, or 47, will however permit the pressure of fluid in chamber 56 to move the valve piston 52 against spring 55 into sealing engagement with gasket 53 and thus close communication between the reservoir and pipe and prevent loss of fluid under pressure from said reservoir.

It will thus be seen that in case pipe 45 should become ruptured, the cut-off valve device 48 will close and prevent loss of fluid under pressure from the auxiliary reservoir 39, under which condition the supply of fluid under pressure to the pilot's control valve device 10 and the engineer's control valve devices 11 to 14 will be maintained through pipes 46 and 47. In case either or both of pipes 46 or 47 should become ruptured, a supply of fluid under pressure to the valve devices 10 to 14 will be maintained through pipe 45. If pipe 41 should become ruptured, the cut-off valve device 40 will close to hold the fluid pressure in the auxiliary reservoir 39 and thereby maintain the supply of fluid under pressure through pipe 45 to the pilot and engineer control valve devices 10 to 14. If the auxiliary reservoir 39 itself should rupture, the check valve 43 will act to bottle the fluid pressure in the emergency reservoir 44 and thus maintain through pipes 46 and 47 a supply of fluid under pressure to the pilot and engineer's control valve devices 10 to 14. The check valve 38 will act in a like capacity in case of rupture of the main reservoir 37 or failure of the compressor 30. It will thus be seen that the possibility of loss of fluid under pressure for controlling the operation of the devices 5 to 8 at the several engines is reduced to a minimum.

The supply of fluid under pressure to the engineer's control valve devices 16 to 27 is obtained from the reservoirs 39 and 44 through a pipe 65 by way of casing 15 of the engineer's control valve devices 11 to 14, so that as long as the supply of fluid is maintained to the latter it will also be maintained to the former except in case of breakage of pipe 65. The possibility of pipe 65 becoming ruptured however is remote since the engines control devices 11 to 27 will all be located at the same control station and in relatively close proximity to each other.

In case one of the pipes 41, 45, 46, or 47 should break and cause closure of the respective cut-off valve device, then in order to effect movement of the valve piston 52 therein back to its open position shown in Fig. 11 after repair of the damage, it is necessary to reduce the differential in fluid pressures acting on said piston to a degree less than the opposing force of spring 55. In the cut-off valve devices so far described, this may be accomplished by the provision of a communication by-passing the valve piston 52 and controlled by a reset check valve 60 normally closing said communication and urged to its closed position by a spring 61 and the pressure of fluid from the reservoir in passage 54. A finger operated plunger 62 is provided for unseating the valve 60 to allow equalization of the fluid pressures on opposite ends of valve piston 52 and consequent movement of same to its open position by spring 55. A spring 63 acting on plunger 62 is provided for moving same out of contact with valve 60 to insure seating of said valve. A valve 64 on plunger 62 is arranged to seat under action of spring 63 to normally prevent leakage of fluid under pressure past said plunger.

The wing flaps (not shown) on the airplane may be arranged for control by supply and release of fluid under pressure through a pipe 70. For controlling this supply and release of fluid under pressure to and from pipe 70 a control valve device 71 of any suitable structure such for example as disclosed in the copending application of Rankin J. Bush and William H. Glass, Serial No. 400,266, filed June 28, 1941, now issued as Patent No. 2,329,742, dated September 21, 1943, and assigned to the assignee of the present application may be employed. The pipe 70 is connected to the control valve device 71, as are pipe 36 which is open to the main reservoir 37, and pipe 31 which connects to the sump reservoir 32. The control valve device 71 is operative to establish communication between pipes 36 and 70 for supplying fluid under pressure from the main reservoir to the latter, and also operative to close said communication and open pipe 70 to pipe 31 to release fluid under pressure from the flap control pipe 71 to the sump reservoir 32. With a normal or maximum pressure of fluid of around 400 pounds per square inch in the main reservoir 37, the pressure of fluid released from the flap control pipe 70 to the sump reservoir 32 may increase the pressure in the sump reservoir to a degree such as 100 pounds per square inch, which however will be quickly reduced by operation of the compressor 30 to recompress this fluid back into the main reservoir 37. It should here be noted that the pressure of fluid in the sump reservoir 32 and thus in the return pipe 33 will therefore vary from, for instance, 100 pounds per square inch to atmospheric pressure, and which latter pressure will also vary with the altitude of the airplane.

All fluid after use in the system to accomplish a desired operation, is released back to the sump reservoir 32 for recompression to the main reservoir 37 as will be hereinafter described. After the initial charging of the system with fluid under pressure, it will therefore be seen that fluid will be drawn from the atmosphere only to compensate for possible leakage in the system. Preferably all fluid taken from the atmosphere by way of check valve 35 in the inlet pipe 34 opening to the sump reservoir 32 will be drawn through any suitable dehydrating means, such as silica-jell, in order to remove moisture therefrom, so that there will be a minimum of moisture in the system thus avoiding failure of any part of the system due to ice while operating in freezing temperatures. It will be noted that the system is a closed system with respect to the fluid pressure used, in that the once dehydrated fluid will be used over and over again.

*Description of speed regulating devices 5*

The speed regulating device 5 associated with each engine 1 to 4 is substantially the same as fully disclosed in Patent No. 2,383,277 issued on August 21, 1945, to Roy R. Stevens, and assigned to the assignee of the present application. Briefly, this device comprises, as shown in Fig. 9, a casing 75 containing a flexible diaphragm 76 having at one side a control chamber 77. In the regulating devices 5 associated with engines 1 to 4 respectively, the chambers 77 are connected through flexible conduits and pipes 78, 79, 80, and 81 to the engineer's speed control valve devices 11, 12, 13, and 14 respectively.

At the opposite side of diaphragm 76 in each of the regulating devices 5 is a chamber 82 containing a head 83 bearing against the diaphragm 76 and having a stem 84 extending through a suitable bore in the casing to the exterior thereof. Within the casing and encircling the stem 84 is an annular groove containing a ring packing 85 providing a seal between the casing and stem for preventing leakage of fluid under pressure from chamber 82 past said stem to the atmosphere. A spring 86 disposed in chamber 82 and under initial compression, bears at one end against the casing and at the opposite end against the head 83 for urging said head and thereby the stem 84 and diaphragm 76 to their normal positions in which they are shown.

Outside of the casing of each regulating device 5, the end of stem 84 is connected by a pin 87 to a lever 88 intermediate the ends of said lever. One end of this lever is pivotally connected by a pin 89 to one end of a link 90 the opposite end of which is connected by a pin 91 to the casing, these connections between the casing and lever providing a floating fulcrum therefor. The opposite end of lever 88 is provided for connection with a speed controlling device such as the throttle control lever 401 or the like on the respective engine in such a manner that when said lever 88 occupies the position shown, the engine will operate at a chosen low speed such as idling. Movement of the lever 88 from this idling position in a clockwise direction, as viewed in the drawing, effects the acceleration of the engine to a degree proportional to the extent of such movement, and maximum speed of the engine being attained when the lever 88 occupies a position such as indicated by a dotted line 92.

At one side of the stem 84 in each regulating device 5, the casing contains a flexible diaphragm 93 which is of relatively small area, such as one-tenth of the area of the main controlling diaphragm 76. The diaphragm 93 has at one side a control chamber 94 and at the opposite side a chamber 95. A follower head 96 in chamber 95 bears against the diaphragm and is provided with a stem 97 which extends through a suitable bore in the casing to the exterior thereof. The casing has an annular groove open to this bore around the stem 97, and in this groove is a ring seal 98 having sealing contact with the casing and periphery of stem 97 for preventing leakage of fluid under pressure from chamber 95 past said stem to the atmosphere.

The end of the stem 97 outside of the casing is pivotally connected by a pin 99 to one end of a bell-crank 100 which at its knee is pivoted on a pin 101 carried by a bracket 102 extending from the casing. The other end of the bell-crank is pivotally connected to pin 87 connecting the diaphragm stem 84 to lever 88. These connections are such that the diaphragm 93, which will be hereinafter called a vernier control diaphragm, is capable of free movement with and in the direction of the main diaphragm stem 84 throughout full travel of said stem under deflection of diaphragm 76 which is limited by contact between the piston head 83 and a shoulder 103 in the casing.

Pressure chambers 94 in the regulating devices 5 associated with engines 1 to 4 are connected respectively through flexible conduits and pipes 104, 105, 106, and 107 to the engineer's speed control valve devices 11, 12, 13, and 14, respectively. In each regulating device 5 diaphragm chambers 82 and 95 are connected together by a passage 108 and thence through a flexible conduit to the return pipe 33, whereby the two diaphragms are constantly subject, in said chambers, to the pressure of fluid in the sump reservoir 32, the ring seals 85 and 98 preventing leakage of fluid under pressure from said reservoir when the chambers are charged to a pressure in excess of that of the atmosphere.

When the diaphragm control chambers 77 and 94 are both open to the sump reservoir 32, in a manner which will be later described, the pressure of fluid on opposite sides of the two diaphragms will be the same since chambers 82 and 95 at the opposite sides of the diaphragms are constantly open through return pipe 33 to the sump reservoir 32. Under this condition the pressure of spring 86 will therefore be effective to deflect the diaphragm 76 and urge the follower head 83 and stem 84 to the positions in which they are shown in Fig. 9. The stem 84 as it is thus moved positions the throttle control lever 88 and thereby the lever 401 in the engine idling position and the vernier diaphragm 93 will occupy a position out of contact with the casing, as shown in Fig. 9.

If it is now desired to accelerate an engine, fluid is supplied to chamber 77 in a manner to be later described, to act on the master diaphragm 76 and when this pressure is increased to a degree sufficient to overcome the opposing pressure of fluid in the sump reservoir 32 effective in chamber 82 plus the pressure of control spring 86, the diaphragm 76 will be deflected toward the left-hand to a position determined by the pressure of fluid supplied to chamber 76, and this deflection will rock the control lever 88 and thereby lever 401 out of the idling position in which it is shown to a position for providing the desired increase in engine speed. If the pressure of fluid in diaphragm chamber 77 is then increased, a corresponding change in position of levers 88 and 401 will be effected so that an increase in the speed of the engine will occur. On the other hand, if the pressure of fluid in chamber 77 is reduced, the levers 88 and 401 will operate to correspondingly reduce the speed of the engine. Maximum engine speed will be obtained when the lever 88 occupies a position such as indicated by the dotted line 92, and this position may be obtained when the pressure of fluid supplied to chamber 77 is sufficient to deflect the diaphragm to the position in which the head 83 contacts shoulder 103 in the casing.

When by operation of the pilot's control valve device 10 fluid is supplied simultaneously to pressure chamber 77 in all of the speed regulating devices 5 in a manner to be later described, it will be seen that the same pressure of fluid will be effective in each of the speed regulating devices 5 to provide simultanous and like adjustment of levers 88 and 401 and thereby of the speed of the several engines. Such like adjustments of levers 401 may not however provide the desired synchronous operation of the several engines due to variations such as before described, however, all of the engines may be brought into desired synchronism by slight adjustments of the lever 88 in one or more of the regulating devices with respect to the lever or levers in the other regulating devices. These slight adjustments may be obtained by supplying fluid under pressure to chamber 94 in the desired one or more regulating devices for acting on diaphragm 93 in opposition to pressure of fluid in chamber 77 acting on the master control diaphragm 76. By this arrangement the selected lever or levers 88 will be adjusted in accordance with the differential in control fluid pressures in chambers 77 and 94 respectively on the two diaphragms 76 and 93. Thus, if the speed of one engine or more than one engine is excessive with respect to the speed of another, such speed may be reduced to bring the engine or engines into desired synchronism with the other engine or engines by supplying the proper degree of fluid pressure to the vernier diaphragm control chamber 94 for modifying the effect of pressure in chamber 77 on the master diaphragm 76 and which will move the lever 88 in the direction to reduce the speed of the engine. By such adjustments of the regulating device 5 for one or more engines the speed of all engines may be brought into desired synchronism, as will now be apparent.

When the several regulating valve devices 5 are connected for simultaneous control from the pilot's control valve device 10 the adjustment of pressure of fluid in chamber 94 on the vernier control diaphragm 93 in said devices to bring the engines into desired synchronous operation is a function of the engineer's control valve devices 11 to 14 as controlled by the engineer, as will be later brought out.

*Description of devices 6, 7, and 8*

The construction of all of these devices may be identical, and as shown in Fig. 10 each may comprise a casing 110 containing a flexible diaphragm 111 having at one side a fluid pressure control chamber 112 and at the opposite side a chamber 113 which is open to the return pipe 33 leading to the sump reservoir 32. The chamber 113 contains a follower or head 114 bearing against the diaphragm and having a stem 115 projecting through a suitable bore in the casing to the exterior thereof. The casing is provided with an annular groove encircling the stem 115 within the bore for carrying a sealing ring 116 which bears against the casing and stem for preventing leakage of fluid under pressure from chamber 113 and thereby from the sump reservoir 32 to atmosphere along said stem. A spring 117 in chamber 113 bears against the head 114 for urging said head and diaphragm 111 to their normal positions, as shown in Fig. 10, when the pressure of fluid in control chamber 112 is the same as the pressure in chamber 113. Outside of the casing the end of stem 115 is connected by a pin 118 to a control lever 119 intermediate its ends. One end of the lever 119 is pivotally connected by a pin 120 to a link 121, the opposite end of which is pivotally connected by a pin 122 to the casing.

In the operation of these devices when the pressure of fluid in control chamber 112 is substantially the same as that in chamber 113 at the opposite side of diaphragm 111, spring 117 will hold the head 114 and diaphragm 111 in their normal position shown and thereby position the connected lever 119 in its normal position shown. When fluid is supplied to control chamber 112 at a pressure exceeding the opposing pressure of fluid in chamber 113 plus that of spring 117 the diaphragm 111 will deflect to the left and move to a position corresponding to the differential in fluid pressures acting on the diaphragm and thus correspondingly position the lever 119 away from its normal position. An increase in the pressure of fluid in control chamber 112 will cause a corresponding further movement of the lever 119 from its normal position, while a reduction in the pressure of fluid in chamber 112 will allow spring 117 to return lever 119 toward its normal position to a degree corresponding to such reduction.

At each engine the levers 119 in the regulating devices 6, 7, and 8 are connected to levers 402, 403, and 405 whereby the richness of the fuel mixture, its temperature and the operation of the supercharger may be regulated in accordance with the adjustment of levers 119 as just described.

Chambers 112 in the mixture regulating devices 6 associated with engines 1 to 4 are connected by pipes 123, 124, 125, and 126 to the engineer's mixture control valve devices 16 to 19, respectively.

Chambers 112 in the temperature regulating devices 7 associated with engines 1 to 4 are connected respectively by pipes 131, 132, 133, and 134 to the engineer's heat control valve devices 20 to 23.

Chambers 112 in the blower regulating devices 8 associated with engines 1 to 4 are connected respectively by pipes 138, 139, 140, and 141 to the engineer's blower control valve devices 24 to 27.

*Description pilot's control valve device 10*

The pilot's speed control valve device 10 comprises a casing containing an automatic or self-lapping valve mechanism which for illustrative purposes only may comprise two spaced and axially aligned flexible diaphragms 147 and 148 of the same areas which are clamped around their marginal edges between two of the casing sections. The two diaphragms are connected for movement in unison by a stem 149 which extends through an opening in a shelf 150 extending from the casing into the space between the two diaphragms. A pressure chamber 151 is provided between the shelf 150 and diaphragm 147 while a pressure chamber 152 is provided at the opposite side of the shelf, these two chambers being in permanent communication through a passage 153 in said shelf. A coil spring 154 contained in chamber 151 has one end supported on the shelf 150 while its opposite end bears against a follower 155 which is secured to the stem 149, said spring being arranged to oppose movement of the diaphragms in a downward direction from the position shown as viewed in the drawing. In this position of the diaphragm the spring 154 is substantially fully expanded.

The two pressure chambers 151 and 152 are arranged to be constantly supplied with fluid under pressure from either of the fluid pressure supply pipes 45 or 46 by way of a double check valve device 156 and a differential pressure regulating valve device 160.

The double check valve device 156 comprises a casing having a chamber to the opposite ends of which open the pipes 45 and 46. A double check valve 161 disposed in this chamber and subject on opposite ends to pressure of fluid in pipes 45 and 46, respectively, is arranged to control communication between said pipes and a passage 157 leading to the regulating valve device 160. With the check valve 161 in the position shown, it closes communication between pipe 46 and passage 157 and opens said passage to pipe 45 and said valve is constantly urged to this position by the pressure of a spring 159. It will thus be seen that with both the auxiliary and emergency reservoirs 39 and 44, respectively, charged with fluid at substantially the same pressure, fluid will be supplied from the auxiliary reservoir to passage 157 by way of pipe 45. In case, however, pipe 45 should become ruptured, the consequent reduction in pressure on the spring side of the check valve 161 will allow emergency reservoir pressure acting on the opposite side to shift the check valve to its opposite position for closing communication between passage 157 and pipe 45 and for opening said passage to the emergency reservoir supply pipe 46.

The pressure regulating valve device 160 comprises a fluid pressure supply valve 144 contained in a chamber 145 constantly supplied with fluid under pressure from the auxiliary reservoir or emergency reservoir by way of passage 157 and is provided for regulating flow of fluid from said chamber to a chamber 146 which is open at all times to pressure chambers 151 and 152 between the two diaphragms 147 and 148. A spring 185 in chamber 145 acts on the supply valve for urging same to its closed position. Chamber 146 is provided at one side of a flexible diaphragm 187 which has its opposite side exposed to pressure in a chamber 217. Chamber 217 is in constant communication with the sump reservoir 32 by way of passage 218 and 219, a chamber 240 below the diaphragm 148 and the return pipe 33.

The supply valve 144 has a fluted stem extending into chamber 146 provided at its end with a release valve 375 arranged to cooperate with a seat 376 provided centrally on the diaphragm 187 for controlling communication between said chamber and chamber 217 and thus the sump reservoir 32. A spring 377 contained in chamber 217 bears at one end against the valve seat 376, while the opposite end is supported on a seat 378 carried on the end of an adjusting screw 379 screw threaded in the casing. This screw is so adjusted as to cause spring 377 to exert a certain chosen pressure on the diaphragm 187.

In operation, the pressure of spring 377 plus the pressure of fluid from the sump reservoir 32 in chamber 217 acting on the diaphragm 187 will deflect same to open the fluid pressure supply valve 144 for allowing flow of fluid under pressure from passage 157 to chamber 146 and thence to chambers 151 and 152 until the pressure of such fluid effective in chamber 146 on the diaphragm overcomes the opposing force of said spring and pressure of fluid in chamber 217. When this occurs, the pressure of fluid in chamber 146 acting on diaphragm 187 will deflect said diaphragm to permit closure of valve 144 and thus limit the pressure of fluid obtained in chambers 151 and 152 to a degree in excess of that acting in the sump reservoir 32 equal to the adjusted force of spring 377 on the diaphragm, regardless of the pressure of fluid in said sump reservoir.

The spring 377 may be so adjusted as to limit the pressure of fluid supplied to chambers 151 and 152 to a degree such as 150 pounds over that in the sump reservoir 32. Thus if the pressure of fluid in the sump reservoir is for instance 100 pounds, the regulating device 160 will supply fluid at 250 pounds pressure to diaphragm chambers 151 and 152. On the other hand if the pressure of fluid in the sump reservoir 32 is equal to that of the atmosphere, then the regulating device 160 will limit the pressure of fluid supplied to chambers 151 and 152 to 150 pounds above atmospheric pressure. For any intermediate degree of pressure of fluid in the sump reservoir 32, the regulating device 160 will limit the pressure obtained in chambers 151 and 152 to a degree 150 pounds in excess of such pressure in the sump reservoir. In case the pressure of fluid in the sump reservoir should be increased, such increase effective on the diaphragm 187 will cause deflection thereof to open the supply valve 144 to cause a like increase in pressure of fluid in chambers 146, 151 and 152. On the other hand, a reduction in pressure of fluid in the sump reservoir 32 will permit the pressure in chamber 146 to deflect the diaphragm 187 out of seating engagement with the release valve 375 which will permit a reduction in pressure in chambers 146, 151, and 152 by flow of fluid under pressure therefrom to chamber 212 and thence to the sump reservoir 32. When the pressure of fluid in chambers 146, 151, and 152 is thus reduced according to the reduction in pressure in the sump reservoir 32, spring 377 will deflect the diaphragm 187 into seating engagement with the release valve 375 for preventing further reduction in pressure in chambers 146, 151, and 152.

It will thus be seen that regardless of the pressure of fluid in the sump reservoir 32, the regulating valve device 160 will maintain fluid in chambers 146, 151, and 152 at a pressure a chosen degree above that in the sump reservoir, such for example as 150 pounds above mentioned, and as governed by the adjustment of spring 377.

When fluid under pressure is being used from chambers 151 and 152 as will be later described the supply valve 144 may not seat as above described, but instead will move toward its seat for throttling the flow of fluid under pressure from chamber 145 to chamber 146 to such a degree as to just maintain the chosen degree of pressure in chambers 150 and 151 in excess of sump reservoir pressure. The valve 144 will actually seat only when no fluid is being drawn from chambers 151 and 152 and when said chambers are charged with fluid at the pressure determined by the force of spring 377 and a stable sump reservoir pressure in chamber 217.

The only purpose of the novel regulating device 160 is to limit the differential of pressures obtainable on the diaphragms 147 and 148 to a degree which will prevent damage to same. It will be noted that diaphragm 148 is subject to the opposing pressures of fluid in chambers 151 and 152 on one side and in chamber 240 at the opposite side so that said diaphragm can never be subjected to a differential in pressures greater than limited by the regulating device 160. The diaphragm 147 is also subject to pressure of fluid in chambers 151 and 152 and the opposing pressure of fluid in a chamber 163 which at times is open to the sump reservoir 32 as will be later described, so that said diaphragm can therefore never be subjected to a differential in fluid pressures greater than provided by the pressure regulating device 160. If the pilot's control valve device 10 were of a type in which the diaphragm or diaphragms could never be subjected to pressure of the fluid in the storage reservoirs, the reducing or regulating valve device 160 might be dispensed with.

Chamber 163 provided above the diaphragm 147 is connected through a port 164 to a passage 165. A sleeve-like bushing 166 is secured in the casing above diaphragm 147 and extends into the pressure chamber 163. A plunger 167 is mounted to slide in the bushing 166. The bushing 166 is provided with an annular recess encircling the plunger 167 and containing a ring seal 168 contacting the bushing and plunger for preventing leakage of fluid under pressure from chamber 163 past said plunger. The lower end of plunger 167 is provided with a valve seat for sealing engagement by a release valve 169 having a fluted stem slidably mounted in a bore in said plunger. This bore extends from the valve seat to a point above the upper end of sleeve 166 whereat it opens through a passage 169a to a chamber 170 which is connected by passages 162, 171, 218, and 219 to chamber 240 below the diaphragm 148 and thus to the return pipe 33. A spring 173 in the bore in plunger 167 bears against the stem of the release valve 169 to unseat same.

The release valve 169 is engaged by the end of a fluted stem projecting from a fluid pressure supply valve 174 which is contained in a chamber 175 provided in the upper end of the diaphragm connecting stem 149. The chamber 175 is constantly supplied with fluid under pressure from pressure chamber 151 by way of bore 176 provided in the diaphragm connecting stem 149 and which bore contains a spring 177 acting on the supply valve for urging same to its closed position shown. Below the plunger 167 and within the bushing 166 is a chamber 178 which is open through one or more bores 179 to an annular chamber 180 encircling the bushing 166 and connected to one end of passage 165. The opposite end of passage 165 is connected to a cut-off valve device 171 which is arranged to control communication between said passage and a pilot's engine speed control pipe 182.

An adjustable operating screw 183 is secured by screw-threaded engagement into the upper end of plunger 167. The plunger 167 is provided around its upper end with a spring seat 184. An initially powered coil spring 185 is interposed between the upper end of bushing 166 and spring seat 184 for constantly biasing the plunger 167 in an upward direction.

An operating shaft 188 arranged at right angles to the axes of the two diaphragms extends through chamber 170 above the operating screw 183 and has its opposite ends journaled in bearings in the casing. An intermediate portion of the shaft is journaled in a bearing provided in a wall 189 which separates chamber 170 from a chamber 190. The shaft 188 extends through an outer wall of chamber 170 and said wall is provided with an annular groove encircling said shaft and containing a ring seal 192 for preventing leakage of fluid under pressure from chamber 170, which is open to the sump reservoir 32, along said shaft to the atmosphere.

A cam 194 disposed in chamber 170 is secured to the shaft 188 for rotation therewith, the peripheral surface of said cam being arranged for contact with the regulating screw 183. A lever 195 for operation by the pilot is secured to the portion of shaft 188 projecting beyond the outer wall of chamber 170. This lever may, if desired be connected through the medium of link 196 and a rock shaft 197 to a similar lever arranged for operation by the co-pilot of the airplane, whereby either the pilot or co-pilot may operate the lever 195 to rock the shaft 188 and cam 194.

In Fig. 3 the pilot's control lever 195 is shown in a position to be used for obtaining operation of engines 1 to 4 at a chosen low or idling speed. The lever is movable from this position in a clockwise direction through a zone indicated by the legend "speed range" for increasing the speed of the engines in accordance with the extent of movement away from the idling position shown, the maximum speed of the engines being obtainable in a position such as indicated by a dotted line bearing the numeral 198. The lever 195 is also movable in a counterclockwise direction from the idling position shown in Fig. 3 to a position indicated by a dotted line 199, for reasons which will be later brought out.

With the pilot's control lever 195 in the engine idling position as shown as well as between this position and the position indicated by the dotted line 199 the cam 194 allows positioning of the regulating screw 183 and plunger 167 by spring 185 as shown in the drawing. In this position of plunger 167 the release valve 169 is opened by spring 173 and the fluid pressure supply valve 174 is closed by spring 177 so as to thereby open the engine speed control pipe 182 and chamber 163 above the diaphragm 147 past said release valve to chamber 170 containing the cam 194 and thus through the return pipe 33 to the sump reservoir 32. Under this condition the spring 154 acting on the diaphragm 147 is fully expanded.

If the pilot now moves the lever 195 from its engine idling position, in which it is shown, in a clockwise direction into the "speed range" zone, the cam 194 acts to move the regulating screw 183 and thereby the plunger 167 in a downward direction. The plunger 167 after a slight downward movement, seats against the release valve 169, then continued downward movement unseats the supply valve 174, whereupon fluid under pressure supplied to chamber 151 below the diaphragm 147 flows past said supply valve to chamber 170 in the bushing 166 and thence through port 179 in said bushing to passage 165 and from said passage through the cut-off valve device 181 to pipe 182.

At the same time fluid under pressure also flows from passage 165 through port 164 to chamber 163 above the diaphragm 147 and acts to deflect said diaphragm against the opposing force of spring 154 and pressure of fluid from the sump reservoir effective in chamber 240 on diaphragm 148. After a certain movement of the diaphragm 147 by pressure of fluid in chamber 163, dependent upon the extent of movement of the pilot's control lever 195 out of its engine idling position and the consequent degree of movement of the supply valve 174 from the normal position shown, the stem 149 which moves with said diaphragm moves into seating contact with the supply valve 174 and thus cuts off further flow of fluid under pressure to pipe 182 and chamber 163 above said diaphragm, thereby limiting the pressure of fluid supplied to said pipe to a degree exceeding that in the sump reservoir 32 by an amount governed by the extent of movement of the control lever 195 out of its engine idling position shown.

If the pilot moves the lever 195 further in a clockwise direction, the supply valve 174 will be again unseated to allow further flow of fluid under pressure to pipe 182 and chamber 163 above the diaphragm 147. The diaphragm 147 will then again be deflected downwardly against spring 154 under this increase in fluid pressure until the supply valve 174 is again seated for closing off the supply of fluid under pressure to said pipe, thereby again limiting the pressure of fluid attained in said pipe in accordance with the new position of the pilot's control lever 195. In case the control lever 195 is moved to the full speed position indicated by the dotted line 198, a maximum degree of pressure over that in the sump reservoir will be obtained in the speed control pipe 182, as will be apparent.

Now in case the pilot moves the control lever 195 in a counterclockwise direction from the full speed position indicated by the dotted line 198 or from any position intermediate the full speed position and the idling position, the cam 194 operates to render the bias spring 185 effective to move the screw 183 and plunger 167 in an upward direction. This movement of the plunger 167 is relative to the release valve 169 due to the action of spring 173 on said valve whereupon the release valve is unseated for releasing fluid under pressure from the speed control pipe 182 and chamber 163 above the diaphragm 147 to the cam chamber 170 and thence to the sump reservoir 32. As the pressure of fluid in chamber 163 above the diaphragm 147 is thus reduced, spring 154 and sump reservoir pressure in chamber 240 acting on diaphragm 148 urges diaphragm 147 upwardly and this movement causes the spring 177 acting on the supply valve 174 to move the release valve 169 in an upward direction. In case the lever 195 is not fully returned to its engine idling position shown, then the release valve 169 will seat against the end of the plunger 167 when the pressure of fluid in pipe 182 and in chamber 163 becomes reduced to a degree depending upon the distance the control lever 195 is away from the engine idling position shown. However, in case the lever is returned to the engine idling position, then the plunger 167 will be so positioned by spring 173 that the release valve 169 will not seat upon equalization of the fluid pressures in diaphragm chamber 163 and pipe 182 with that in the sump reservoir effective in diaphragm chamber 240 since when this occurs, the spring 154 will be in a fully expanded position.

It will thus be seen that with the pilot's control lever 195 in the engine idling position as shown, the pressure of fluid in the speed control pipe 182 will be the same as that in the sump reservoir 32 while upon movement of said lever in a clockwise direction, as viewed in Fig. 3, out of idling position or in the opposite direction toward idling position, the pressure of fluid obtained in pipe 182 will exceed that in the sump reservoir by an amount proportional to the distance said lever is away from its engine idling position.

As just mentioned, the pressure of fluid attained in pipe 182 with the pilot's control lever 195 out of idling position and in the "speed range" zone will exceed that in the sump reservoir by an amount corresponding to the lever position and this condition will always be attained regardless of the pressure in the sump reservoir since the pressure in said reservoir is constantly effective in chamber 240 on diaphragm 148 and thus cooperative with the control spring 154 to limit the pressure of fluid in pipe 182. In other words, assuming that the pressure in the sump reservoir is that of the atmosphere, the pressure obtained in pipe 182 for a selected position of lever 195 out of idling position will exceed that of the atmosphere or sump reservoir by an amount governed by the force of spring 154 plus atmospheric pressure in chamber 240 acting on diaphragm 148. If now the pressure in the sump reservoir is increased for any reason, such pressure acting on diaphragm 148 will deflect same to open the supply valve 174 and cause a corresponding increase in pressure in pipe 182 thus maintaining the same differential between the pressures in said pipe and in the sump reservoir as existed prior to the increase in pressure in the sump reservoir. On the other hand, if the pressure in the sump reservoir should become reduced, such reduction in pressure in chamber 240 on the diaphragm 148 will allow the pressure of fluid in chamber 163 acting on diaphragm 147 to deflect same downwardly and thereby unseat the release valve 169 for releasing fluid under pressure from the pipe 182 and chamber 163, and when the pressure in pipe 182 and chamber 163 becomes reduced corresponding to the reduction in sump reservoir pressure in chamber 162, the spring 154 will deflect the diaphragms to close the release valve 169 for thereby again limiting the pressure in pipe 182 in accordance with the reduction in sump reservoir pressure effective in chamber 240. In other words the same differential between the pressures in pipe 182 and sump reservoir will be obtained in any position of the pilot's control lever 195 in the "speed range" zone, regardless of the pressure effective in the sump reservoir.

The cut-off valve device 181 arranged in the fluid flow connection between passage 165 and pipe 182 may, with the exception of the omission of the reset structure, be structurally identical to the cut-off valve devices 40 and 48 to 50, hereinbefore described. The cut-off valve device 181 therefore comprises a valve piston 52 for controlling communication between passage 165 and pipe 182. The valve piston is biased to the communication opening position by a spring 55. The chamber 56 at the opposite side of the piston in this embodiment is connected to an operating volume 200 provided in the casing of the pilot's control valve device. When fluid under pressure is supplied to pipe 82, this volume is charged with fluid under pressure from passage 165 by way of the restricted port 57. In case of breakage of pipe 182 when charged with fluid under pressure, the restricted port 57 acts to limit the release of fluid pressure from volume 200 so as to thereby maintain a sufficient pressure in chamber 56 on the one side of the valve piston for moving said piston to its closed position against the force of spring 55 upon the release of fluid under pressure from the opposite side through said pipe. The cut-off valve device 181 is thus adapted to act in case of breakage of pipe 182 to prevent loss of fluid under pressure from either the auxiliary reservoir or emergency reservoir in case the operator's control lever 195 should be moved to or be in a position in the "speed range" zone supplying fluid under pressure from said reservoir to passage 165.

In order to return the valve piston 52 in the cut-off valve device 181 to its communication opening position shown in the drawing, as after repair of the broken pipe 182, the pilot need only move the control lever 195 back to its idling position for thereby releasing fluid under pressure from chamber 56 and the operating volume 200 to the sump reservoir 32. With the pressure in the sump reservoir equal substantially to that of the atmosphere due to operation of the compressor 30 and with the pressure of fluid in chamber 56 correspondingly reduced spring 55 will then move the valve piston 72 to its communication opening position in which it is shown.

The pilot's control valve device 10 also embodies a transfer control valve device 201 comprising a poppet valve 202 contained in a chamber 203 which is constantly supplied with fluid under pressure from chamber 151 between the two diaphragms 147 and 148. This valve is provided for controlling communication between chamber 203 and a chamber 209 provided at one end of a bore 204 and which is open to a transfer control pipe 205 leading to the body 15 of the engineer's control valve devices 11 to 14. A spring 203a in chamber 203 acts on the supply valve 202 for urging same to its seated position. A plunger 206 is slidably mounted in bore 204 and carries a poppet type release valve 207 arranged to seat on the plunger in a direction opposite to the seating of the supply valve 202, said valves having fluted stems extending in the direction of each other for contact in chamber 209. The casing is provided with an annular groove encircling the plunger 206 and containing a sealing ring 208 engaging the outer peripheral surface of the plunger for preventing leakage of fluid under pressure from chamber 209 to a chamber 210 at the opposite side of the plunger, the chamber 210 being in constant communication through passages 162, 171, 219, and diaphragm chamber 240 with the return pipe 33 and thereby the sump reservoir 32. A spring 211 in chamber 209 acts on the plunger 206 for urging same in a direction away from the supply valve 202; a shoulder 215 being provided for contact with plunger 206 to limit movement thereof by spring 211.

The chamber 210 is separated from chamber 199 by a wall 212 in which a plunger 213 is slidably mounted in axial alignment with the release valve 207 and having one end in contact therewith. A cam 216 disposed in chamber 199 is secured to the shaft 188 for rotation therewith and has its peripheral surface arranged for contact with the plunger 213. This cam is so designed that with the pilot's control lever 195 in the idling position shown in Figs. 3 and 4 and in all positions to the right thereof in the "speed range" zone the plunger 213 will be displaced in a downward direction to an extent sufficient for seating the release valve 207 against the plunger 206 and for so positioning said plunger in its bore that the stems of the release valve 207 and supply valve 202 will be in contact with each other and the supply valve will be open.

Thus while the pilot's control lever 195 is in the "speed range" zone for controlling the speed of engines 1 to 4 fluid under pressure will be supplied past the supply valve 202 to the transfer control pipe 205. When the pilot's control lever 195 however is moved from its idling position to the position indicated by the dotted line 199, a recess 214 in the cam 216 allows the force of spring 211 to move plungers 206 and 213 in a direction away from the supply valve 202. The plunger 206 thus moves until it contacts the stop 215 which allows closing of the supply valve 202 by the pressure of spring 203a. The recess 214 then allows further movement of plunger 213 by the release valve 207 under pressure of fluid from the transfer control pipe 205 to a position in which said valve is opened and releases fluid under pressure from said pipe to the sump reservoir 32.

*Description—engineer's speed control valve devices 11 to 14*

As above described the engineer's speed control valve devices 11 to 14 for controlling the speed of engines 1 to 4, respectively, are all structurally identical and are associated with the common housing 15. In the housing 15 are four passages 220, 221, 222, and 223 which extend therethrough for connection with each of the valve devices 11 to 14. The passage 220 is connected to the pilot's speed control pipe 182. The passage 221 constituting a fluid pressure supply passage to the four valve devices 11 to 14 and to pipe 65 by way of a passage 229 is connected to a pressure regulating valve device 224 which is mounted on one side of the housing 15 and which device carries a double check valve device 226 having connections with the auxiliary and emergency reservoir pipes 45 and 47. The passage 222 is connected to the transfer control pipe 205 leading to the pilot's control valve device 10. The passage 223 is connected to the return pipe 33 leading to the sump reservoir 32.

The pressure regulating valve device 224 and double check valve device 226 are structurally and functionally identical to corresponding devices 160 and 156 associated with the pilot's control valve device 10. While the same reference numerals have been applied in the drawings to the corresponding parts of these devices, a detailed description however is not necessary beyond mentioning that chamber 217 in the regulating device 224 is constantly open to the sump reservoir 32 in this embodiment by way of a passage 232 which opens to a passage 233 in the engineer's speed control valve device 11 and which latter passage is open to the sump reservoir passage 223. It is desired to point out however that the pressure regulating valve device 224 and the double check valve device 226 cooperate to maintain in passage 221 fluid at a pressure a chosen degree in excess of that in the sump reservoir 32 regardless of the pressure of the fluid in the sump reservoir. The pressure thus maintained in passage 221 is preferably substantially the same as provided in the pilot's control valve device 10 by the regulating device 160. The two pressure regulating devices 160 and 224 are employed one for the pilot's control valve device and the other for the engineer's control valve devices, in preference to the use of one regulating valve device for both, in order to connect each of said control valve devices to both the auxiliary and emergency reservoirs and obtain at each control valve device a maximum degree of protection against loss of fluid under pressure due to pipe breakage. It is desired to again point out that the regulating valve devices 160 and 224 are only required with control devices such as employed for illustrative purposes which embody diaphragms that at some time might otherwise be subjected to the destructive differential between the pressure in the storage reservoirs and that in the sump reservoir.

Each of the engineer's speed control valve devices 11 to 14 comprises a control transfer valve device 241 and an engine speed control valve device 242.

The transfer valve device 241 comprises a flexible diaphragm 243 having at one side a chamber 244 which is normally connected through a passage 245 to passage 222 connected by pipe 205 to the pilot's control valve device 10. At the opposite side of diaphragm 243 is a valve chamber 246 constantly supplied with fluid under pressure from passage 221 through a passage 247. A spring 248 in chamber 244 acts on the diaphragm 243 urging same in the direction of valve chamber 246.

The valve chamber 246 contains a slide valve 249 which is mounted between two spaced shoulders provided on an operating stem 250 which is connected at one end to a diaphragm 243 whereby movement of the diaphragm in either one direction or the other will cause corresponding movement of the slide valve.

The diaphragm 243 and slide valve 249 have two operating positions, namely a pilot's engine speed control position as shown in the drawing and an engineer's engine speed control position which may be defined by contact between the stem 250 and a stop 251 in the housing. When the pilot's control lever 195 is in the engine idling position, as shown in Fig. 3, or in any position to the right thereof in the "speed range" zone, thereby effecting operation of the control transfer device 241 to supply under pressure to pipe 205, this pressure will be effective in chamber 244 at one side of the diaphragm 243 and render spring 248 effective to move the diaphragm 243 and slide valve 249 to the pilot's speed control position shown in Fig. 5. However, when the pilot's control lever 195 is moved to the position indicated by the dotted line 199 and the control transfer valve device 241 therefore operates to release fluid under pressure from pipe 205 to the sump reservoir 32, the corresponding release of fluid under pressure from the diaphragm chamber 244 renders the pressure of fluid in valve chamber 246 effective to move the diaphragm 243 and thereby the slide valve 249 to the engineer's control position defined by engagement of stem 250 with the stop 251. It will be noted that with diaphragm chamber 244 open to the sump reservoir, the diaphragm 243 is protected against rupture since the pressure of fluid in chamber 246 at the opposite side of the diaphragm is under the control of the regulating valve device 224.

Passage 220 in the housing, which passage is connected to the pilot's speed control pipe 182, is connected by a branch passage 253 to the seat of slide valve 249. The slide valve 249 is provided with a cavity 254 arranged in the pilot's control position of said valve to connect branch passage 253 to a passage 255.

In the engineer's speed control valve device 11 the passage 255 is connected to pipe 78 leading to diaphragm chamber 77 in speed regulating device 5 associated with engine 1. The passage 255 in the other engineer's speed control valve devices 12 to 14 are connected respectively by pipes 79, 80, and 81 to the speed regulating devices 5 associated with engines 2, 3, and 4. With the slide valves 249 of all of the engineer's speed control valve devices 11 to 14 in the pilot's control position as shown in Fig. 5, and which as above described will be assumed with the pilot's control lever 195 in its engine idling position or in any position in the "speed range" zone, it will be seen that the pilot by movement of lever 195 into said zone may cause simultaneous operation of all of the speed regulating devices 5 and thus simultaneous adjustment of the speed of the several engines. When however the diaphragm 243 and slide valve 249 in the engineer's speed control valve devices 11 to 14 occupy the engineer's control position defined by contact between stem 250 and stop 251, and which position is obtained upon movement of the pilot's control lever to the positions indicated by line 199 communication between the pilot's speed control pipe 182 and the several speed regulating devices 5 by way of cavities 254 in the slide valves 249 is broken to thereby prevent control of engine speed by the pilot.

Each of the engineer's speed control valve devices 11 to 14 further comprises a flexible diaphragm 257 clamped around its margin between the housing 15 and a cover member 258. This diaphragm has at one side a chamber 259 in constant communication with the sump reservoir through the passage 233 hereinbefore mentioned, and at the opposite side a chamber 260 which is connected by a passage 252 to the seat of slide valve 249. A follower 261 is secured centrally to diaphragm 257 and has a passage 262 for connecting chamber 260 to chamber 259. In chamber 260 the follower 261 is provided around the end of passage 262 with a valve seat arranged for engagement by a release valve 263 which is provided on the end of a fluted stem projecting from a supply valve 264 contained in a chamber 265 which is constantly supplied with fluid under pressure from the supply passage 221 past a check valve 266. The check valve 266 seats oppositely to the supply valve 264 and a spring 267 contained in chamber 265 bears at opposite ends on said valves for urging them to their seated or closed positions as shown.

Above chamber 259 the cover 258 is provided with a bore open to said chamber and axially aligned with the diaphragm 257 and containing a plunger 269 between which and the diaphragm follower 261 is interposed a control spring 270. The plunger 269 has an operating stem 271 slidably mounted in a bore in cover 258 and extending into a chamber 272 in said cover. The cover is provided with an annular groove encircling plunger 271 and containing a sealing ring 273 contacting the peripheral surface of the plunger for preventing leakage of fluid under pressure from chamber 259, which is open to the sump reservoir 32, to chamber 272.

Chamber 272 contains a cam 274 which is mounted on an operating shaft 275 with its peripheral surface in contact with the end of plunger 271. A lever 276 is secured to the shaft 275 for turning same and the cam 274 relative to the plunger 271.

In each of the engineer's speed control devices 11 to 14 the passage 252 connecting chamber 260 below the diaphragm 257 to the seat of the transfer slide valve 249 is connected, with said slide valve in the pilot's control position shown in the drawing by a cavity 277 in said slide valve to a passage 268 which in turn is connected by pipe 104, 105, 106, or 107 to the vernier diaphragm chamber 94 in the respective regulating device 5. In the engineer's control position of slide valves 249, the passages 268 are disconnected from passages 252 and the latter are connected by cavities 277 in said slide valves to passages 255 which are connected to the master diaphragm control chambers 77 in the speed regulating devices 5.

It will thus be seen that in the pilot's control position of slide valves 249, the master diaphragm chambers 77 in all of the regulating devices 5 are connected to the pilot's control valve device 10 so that the pilot may control the pressure therein, as previously described, while the vernier diaphragm control chamber 94 in the regulating devices 5 associated with engines 1 to 4 are connected to chambers 260 in the engineer's speed control valve devices 11 to 14, respectively. In the engineer's control position of the slide valves 249 the regulating devices 5 are disconnected from the pilot's control valve device 10, and the master control chambers 77 in said devices associated with engines 1 to 4 are connected to chambers 260 in the engineer's speed control valve devices 11 to 14, respectively.

When the lever 276 and cam 274 in each of the engineer's speed control valve devices 11 to 14 are in the positions shown in the drawing, the plunger 269 will assume the position shown for relieving pressure of spring 270 on diaphragm 257 so that said diaphragm may assume the position shown for opening communication past the release valve 263. It will thus be seen that if the control levers 276 of the engineer's speed control valve devices 11 to 14 are in the positions shown, the vernier diaphragm control chambers 94 in all of the speed regulating devices 5 will be open to the sump reservoir 32 when the transfer slide valves 249 is in the pilot's control position shown. With the slide valves 249 thus positioned the engineer may operate lever 276 of any one of the speed control valve devices 11 to 14 to supply fluid at any desired degree of pressure to the respective vernier diaphragm chamber 94 for thereby modifying the effect of fluid pressure provided in the master diaphragm chamber 76 of the respective speed regulating device by the pilot's operation of lever 195, as will now be described.

Let it be assumed that the engineer desires to supply fluid under pressure to the vernier diaphragm control chamber 94 in the speed regulating valve device 5 associated with engine 1. To accomplish this end, he moves the control lever 276 of the control valve device 11 out of the position shown in Fig. 5 in a clockwise direction and thereby actuates cam 274 to move the plungers 271 and 269 in the direction of diaphragm 257. This movement of the plungers acts to compress spring 270 the force of which acting on the diaphragm follower 261 moves same into seating contact with the release valve 263 following which further movement acts through said release valve to unseat the supply valve 264. When the supply valve 264 is thus opened, fluid under pressure will flow from chamber 265 to diaphragm chamber 260 and thence through passage 252, cavity 277 in the transfer slide valve 249 and passage 268 to pipe 104 and thence to the vernier diaphragm control chamber 94 in the respective speed regulating valve device 5. When the pressure of fluid is thus increased in diaphragm chamber 260 in the engineer's speed regulating valve device 11 and thereby in the vernier diaphragm control chamber 94 of the speed regulating valve device 5 to a degree which overcomes sump reservoir pressure in chamber 259 plus the control force of spring 270, the diaphragm 257 deflects in an upward direction which allows spring 267 to seat the supply valve 264 and cut off further flow of fluid under pressure to chamber 260 and the respective vernier diaphragm control chamber 94. The pressure of fluid obtained in the vernier diaphragm control chamber 94 in excess of opposing sump reservoir pressure in chamber 95 is thus limited by the degree of compression of control spring 270 which in turn is governed by the extent of movement of lever 276 out of its normal position shown in Fig. 5. If now the engineer desires to increase the pressure of fluid in the vernier diaphragm control chamber 94, the respective control lever 276 may be moved further in a clockwise direction as viewed in Fig. 5 and a corresponding increase in pressure will occur in an evident manner. On the other hand if it is desired to reduce the pressure of fluid in the vernier diaphragm chamber 94, the lever 276 may be moved in the opposite direction to reduce the pressure of spring 270 on the diaphragm 257. Upon such a reduction in spring pressure, the pressure of fluid in chamber 260 will deflect the diaphragm 257 out of engagement with the release valve 263 and thus permit the pressure of fluid in said chamber and in the connected vernier diaphragm chamber 94 to reduce by flow of fluid to chamber 259 and thence to the sump reservoir 32. If the lever 276 is still out of its normal position shown, the pressure in chamber 260 and connected vernier diaphragm chamber 94 will reduce as just described until the force of spring 270 predominates and which will then deflect the diaphragm back into contact with the release valve 263 and thereby limit the reduction in pressure in said chambers in accordance with the position of lever 276. If the lever is returned to its normal position shown, a complete release of fluid under pressure from chamber 260 and the connected vernier diaphragm chamber 94 will occur or such pressure will reduce to equalization with that in the sump reservoir. It will thus be seen that any desired pressure of fluid in excess of that acting in the sump reservoir 32 may be provided in chamber 260 and the connected vernier diaphragm chamber 94 by the proper positioning of lever 276.

It will be readily apparent that since the pressure of fluid in the sump reservoir 32 coacts in chamber 259 on diaphragm 275 with the force of spring 270, the pressure of fluid supplied to chamber 260 and the connected vernier diaphragm chamber 94 will exceed that in the sump reservoir by a degree governed by said spring regardless of the pressure in said reservoir, and it will be further apparent that since sump reservoir pressure in chamber 95 opposes the pressure of fluid in the vernier diaphragm chamber 94 in the regulating device 5, said device will be adjusted in accordance with the position of the engineer's control lever 276 regardless of the pressure of fluid in the sump reservoir 32.

From the above description it will now be seen that the pilot may operate lever 195 to supply fluid to the master control chambers 77 in the several regulating devices 8 to effect simultaneous adjustment of said devices to adjust the speed of the engines 1 to 4. However in the event that all of the engines do not operate in the desired synchronism in response to this operation of the pilot's control lever 195, and as may be determined by the engineer at his station through the observation of suitable gages or other indicating devices, the engineer may then bring the engine or engines which are not properly operating, into the desired synchronism by operation of the lever or levers 276 of the respective speed control devices 11, 12, 13, or 14 to supply fluid to the vernier diaphragm control chamber 94 in the respective regulating device 5. The fluid thus supplied to chamber 94 in the one or more regulating devices 5 will modify the effect of the fluid pressure in chamber 77 acting on the master diaphragm and thereby effect a slight change in the speed of the respective engine or engines as required to bring same into the desired synchronism with the other engines.

In each of the control transfer devices 241 there is a reservoir or volume 278 which is open to the valve chamber 246 with the slide valve 249 in the pilot's control position shown, so that said reservoir will become charged with fluid under pressure. In the engineer's control position of slide valve 249 a cavity 279 therein is provided for connecting this charged reservoir 278 to a passage 280 which leads to a chamber 281 provided in the cover 258 at one side of a piston 282. The piston 282 has a stem 283 projecting through a chamber 284 at the opposite side of the piston into operative alignment with a shoulder 285 provided on the cam 274. A spring 286 in chamber 284 acts on the piston 282 for urging same to a normal position, as shown in Fig. 5, when chamber 281 is void of fluid pressure. With the piston 282 and stem 283 in this normal position the end of the stem is so spaced from shoulder 285 on cam 274 as to permit movement of the lever 276 from the position in which it is shown through its full travel to a position such as indicated by dotted line 287, so as to thereby in no way interfere with operation of the engineer's control lever 276 to vary the pressure of fluid as desired in the vernier diaphragm control chamber 94 of the respective regulating valve device 5 as hereinbefore described.

If the pilot desires to transfer the control of speed of all engines 1 to 4 to the engineer, he moves the lever 195 of his control device 10 to the position indicated by the dotted line 199 and this causes operation of the control transfer valve device 201 to release fluid under pressure from pipe 205 and thereby from diaphragm chambers 244 in the several engineer's control valve devices 11 to 14. Upon this release of fluid under pressure from diaphragm chambers 244 the opposing pressure of fluid in valve chambers 246 deflect the diaphragms 243 downwardly and move the slide valves 249 to the engineer's control position defined by contact between the stems 250 and the stops 251 as hereinbefore described. In this engineer's control position of each slide valve 249 the reservoir or volume 278 previously charged with fluid under pressure is connected to cavity 279 in said slide valve so that fluid under pressure from said reservoir will flow to piston chamber 281 to thereby act on the piston 282 and move same against the pressure of spring 286. This movement of piston 282 causes contact between the end of stem 283 and shoulder 285 on the respective cam 274 and if the lever 276 is out of its normal position shown said piston then acts to move said lever to its normal position. Thus, if any of the levers 276 are out of their normal position at the time the pilot transfers the control of speed of the engines to the engineer, such lever or levers will be returned to normal position by operation of the respective piston or pistons 282. When the pistons 282 complete their strokes under the influence of the pressure of fluid in chamber 281, chambers 281 are opened to the atmosphere through a release port 287 through which fluid under pressure is promptly dissipated from said chambers and thereby the volumes 278, whereupon springs 286 return said pistons and the stems 283 to their normal position as shown.

When the pilot causes operation of the control transfer valve devices 241 to transfer the control of speed of the engines to the engineer, the movement of the slide valves 249 to the engineer's control position disconnects passages 255 from the pilot's speed control pipe 182 and connects said passages through cavities 277 in said valves to passages 252 leading to chambers 260 in the engineer's speed control valve devices, passages 268 connected with the vernier control diaphragm chambers 94 in the regulating devices 5 being lapped by the slide valves under this condition as previously described. Each of the engineer's speed control devices 11 to 14 is thereby rendered effective to control the pressure of fluid in chamber 77 on the master control diaphragm of the regulating device 5 associated with the respective engines, whereby the engineer may adjust or regulate the speed of the engines individually. Since under this condition the master diaphragm 76 in the regulating devices 5 is subjected to the pressure of fluid supplied by the engineer's control devices 11 to 14, the same range of variation in engine speed is provided for as when such control was under the jurisdiction of the pilot.

The purpose of the operation of pistons 282 upon movement of transfer slide valves 249 from the pilot's control positions to the engineer's control positions is to effect movement of any lever 276 to its normal position in case it had previously been adjusted out of normal position for supplying fluid under pressure to the respective vernier diaphragm control chamber 94. By thus moving the lever 276 back to normal position, the fluid pressure supplied by the respective device prior to such movement can not become effective in chamber 77 of the regulating device 5 and cause undesired acceleration of the respective engine upon the transfer of control from the pilot to the engineer.

The pilot may, at will, take back the control of speed of engines 1 to 4 by moving lever 195 back to the normal position or into the "speed range" zone, since such movement will cause the transfer slide valves 249 to return to the pilot's control position in which it is shown thus providing for the control of speed of all engines 1 to 4, as a unit, by the pilot, and vernier control of each engine individually by the engineer as above described.

In each of the engineer's speed control valve devices 11 to 14 a plug valve 288 is provided to control communication through passage 245 between the control transfer passage 222 and the respective diaphragm chamber 244. Each of these valves has two positions and is movable to either of said positions by an operating handle 289. With the handle in the position shown in Figs. 1 and 5 the valve 288 establishes communication between the respective diaphragm chamber 244 and the control transfer pipe 205 which provided for control of the diaphragm 243 and slide valve 248 from the pilot's control valve device 10 in the manner above described. When, however the handle 289 is moved to its other position indicated by a dotted line bearing the reference numeral 290, the valve 288 is operated to close communication between diaphragm chamber 244 and pipe 205, and said chamber is connected to the sump reservoir passage 233 for thereby releasing fluid under pressure from said chamber to said reservoir to allow movement of the diaphragm 243 and slide valve 248 to the engineer's control position.

The handles 289 will normally be carried in the position shown in the drawing in order that the apparatus will operate as hereinbefore described. In case trouble should develop in one engine or another, however while the engines are under the control of the pilot, the engineer may move the respective handle or handles 289 to the position indicated by line 290 for thereby removing control of the respective engine or engines from the pilot and transferring such control to the engineer who can then stop the engine or engines, if such is desired or necessary. If, however, the engineer is able to correct the difficulty, he may then transfer the control of the engine or engines back to the pilot by turning the respective lever or levers 289 back to the position in which they are shown in the drawing.

A cut-off valve device 291 is secured to the housing 15 of the engineer's control valve devices 11 to 14 in the connection to each of the pipes connected to the several speed regulating devices 5. These cut-off valve devices may be identical in construction and operation to the cut-off valve device 181 associated with the pilot's control valve device 10 and each is provided to operate in case of breakage of the respective pipe to prevent loss of fluid under pressure through said pipe to atmosphere.

As above described, the pressure of fluid supplied by each of the engineer's speed control valve devices 11 to 14 to diaphragm chamber 260 and by the pilot's control valve device 10 to the speed control pipe 182, for controlling operation of the respective regulating valve device 5 will vary not only in accordance with the position of the respective control levers 276 and 195, but also in accordance with the pressure of fluid in the sump reservoir 32. The diaphragms in the speed regulating devices 5, which are subjected to pressure of fluid supplied by operation of one or another of the engineer's speed control devices or by the pilot's control valve device 10, are also subject to the opposing pressure of fluid in the sump reservoir 32, so that the effect of pressure from the sump reservoir in the engineer's and pilot's speed control valve devices is off-set by its corresponding effect in the regulating devices 5 and therefore has no effect upon adjustment of said regulating devices in accordance with selected positioning of the operating levers 195 and 276.

From the above description, it will now be seen that the pilot's control valve device 10 provides for control by the pilot of the speed of all of the engines in one bank in unison or simultaneously, as desired during flight. With the engines thus under control of the pilot, the engineer cannot interfere in any way with such control except to make minor or vernier adjustments of the speed regulating devices 5 individually for the purpose of synchronizing one engine with another. In case of difficulty with an engine the engineer may, however, annul the control of that engine by the pilot and subsequently return control to the pilot in case the difficulty is overcome.

It will also be noted that the pilot can, at will, take over the control of all engines, and can, at will, transfer the control to the engineer. When the engines are placed under the control of the engineer, he may regulate the speed of the engines individually as desired, but there is no vernier adjustment of the engine speed under such control.

*Description—engineer's mixture heat and blower control valve devices 16 to 27*

These valve devices are embodied in the common housing 28 as above mentioned to which are connected the return pipe 33 from the sump reservoir 32, and the fluid pressure supply pipe 65 from body 15 of the engineer's speed control valve devices 11 to 14, the latter pipe being constantly supplied with fluid under pressure from the pressure regulating valve device 224. The housing 28 is provided with a passage 296 connected to the return or sump reservoir pipe 33 and having branches which will hereinafter be described leading to each of the control valve devices 16 to 27. The housing 28 also has a passage 297 connected to the supply pipe 65 and provided with branches for supplying fluid under pressure to each of the control valve devices 16 to 27.

Each of the mixture control valve devices 16 to 19 may be identical in structure and operation; the valve device 16 being shown in section in Fig. 8 for illustrating the structures.

Referring to Fig. 8, the valve device 16 comprises a flexible diaphragm 298 clamped between the housing 28 and a cover 299 and having at one side a chamber 300 open through a cut-off valve device 301, like the cut-off valve device 181 before described, to pipe 123 leading to the mixture regulating valve device 6 at the engine 1. At the opposite side of diaphragm 298 is a chamber 302 which is open through a passage 303 in the cover 299 and a passage 304 in the housing to passage 296 which is connected to the return pipe 33. A seat member 305 is secured to the diaphragm 298 at its center and is provided with an axial bore 307 for connecting chamber 300 to chamber 302. A release valve 306 provided in chamber 300 is arranged to cooperate with the seat member 305 for closing communication through the bore 307 and thereby between chambers 300 and 302. This valve is provided on the end of the fluted stem of a supply valve 308 contained in a chamber 309 which is constantly supplied with fluid under pressure from the supply passage 297 by way of a branch passage 309a and past a check valve 310 contained in chamber 309. A spring 311 is interposed between the supply valve 308 and check valve 310 for urging same in opposite directions to their seated positions shown.

The cover 299 has a bore open to chamber 302 and containing a plunger 312 which is mounted to slide therein. A control spring 313 is interposed between and bears at opposite ends against the plunger 312 and the seat member 305 on the diaphragm 298. The plunger 312 has an operating stem 314 extending through a wall in the casing into a chamber 315, a sealing ring 322 being secured in this wall around and contacting said stem for preventing leakage of fluid under pressure from the sump chamber 302 to chamber 315. In chamber 315 the stem 314 is engaged by the periphery of a cam 316 which is secured to turn with a shaft 317 to which an operating lever 127 is secured.

With the lever 127 in the position shown in Fig. 8, the cam 316 is positioned to allow such expansion of spring 312 as to permit deflection of diaphragm 298 out of seating engagement with the release valve 306 so as to thereby connect chamber 112 in the mixture control valve device 6 associated with engine 1 to the return pipe 33 by way of pipe 123 and past said release valve. Under this condition the supply valve 308 is seated by spring 311. If the operator now moves the handle 127 in a counterclockwise direction, as viewed in Fig. 8, from the position shown, the cam 316 will be operated to move the plunger 312 in the direction of diaphragm 298 for thereby increasing the force of spring 313 on said diaphragm. This increase in pressure of spring 313 on diaphragm 298 will deflect same first into contact with the release valve 306 and then act through said valve to open the supply valve 308 for thereby supplying fluid under pressure from the supply pipe 65 to diaphragm chamber 300 and thence through pipe 123 to diaphragm chamber 112 in the respective mixture control valve device 6. Fluid will thus be supplied to the mixture regulating device 6 until the pressure thereof acting in diaphragm chamber 300 becomes sufficient to deflect the diaphragm against the opposing pressure of spring 313 and of fluid in chamber 302 which is open to the sump reservoir 32, and when this condition is attained, diaphragm 298 will deflect upwardly to allow seating of the supply valve 308 for thus limiting the pressure of fluid attained in the mixture regulating device 6 in accordance with the pressure of the control spring 313, in turn governed by the position of lever 127 away from its normal position shown. Further movement of the lever 127 in a direction away from its normal position will cause a corresponding increase in pressure of fluid in pipe 123 and thereby in diaphragm chamber 112 of the mixture control device 6; while movement of lever 127 in the opposite direction resulting in a reduction in force of the control spring 313, will result in the diaphragm being deflected out of contact with the release valve 306 by the pressure of fluid in chamber 300. Fluid under pressure will then be released from diaphragm chamber 112 in the mixture regulating device 6 until the pressure in said chamber and in chamber 300 is reduced to a sufficient degree below the opposing pressure on the diaphragm, that said opposing pressure will move said diaphragm back into contact with the release valve 306 for thereby again limiting the pressure of fluid acting in the mixture regulating device 6 in accordance with the position of the control lever 127. Return of lever 127 to its normal position will allow substantial full expansion of spring 313 so that the diaphragm 298 may move to and then remain in the position shown in the drawing to provide for equalization of the fluid pressure in chamber 112 of the respective regulating device 6 into the sump reservoir 32.

It will now be seen that the position of lever 127 predetermines the pressure of fluid in excess of that in the sump reservoir 32 provided in diaphragm chamber 112 of the mixture regulating device 6.

The lever 119 of each of the mixture regulating devices 6 may have a plurality of different positions, such as four, including its normal position in which it is shown, for providing different degrees of richness, leanness, etc., of the fuel supply to the respective engine. Equalization of the opposing fluid pressures on diaphragm 111 in the regulating devices 6 will provide for obtaining one of these four positions, while the provision of three different degrees of fluid pressure in chamber 112 in excess of the pressure of fluid in the sump reservoir 32 will provide for obtaining the other three positions of lever 119.

To provide these three different degrees of fluid pressure in chamber 112 of the regulating devices 6, the lever 127 in each of the mixture control valve devices 16 to 19 may therefore have outside of the normal position in which the lever is shown, three other positions such as indicated by dot and dash lines 380, 381, and 382. Movement of the lever 127 to any one of these three positions or to its normal position will therefore cause corresponding positioning of lever 119 in the respective regulating device 6 as will now be seen.

Each of the engineer's mixture control valve devices 17, 18, and 19 operates in the same manner as the control valve device 16 for controlling operation of the respective mixture regulating devices 6 at the different engines. It will thus be seen that the fuel mixture to each engine can be individually adjusted by the engineer to provide desired operation.

Each of the engineer's heat control valve devices 20 to 23 is identical in construction to the mixture control valve devices 6 just described, and the same reference numerals have been applied to the corresponding parts except for the control lever which has been designated by the numeral 135. As shown in Fig. 7 the heat control devices 20 to 23 are connected with the fluid pressure supply passage 297 through passages 319, and to the sump reservoir passage 296 through passages 320, and each is also connected through a control passage 321 and a cut-off valve device 323, like the cut-off valve device 181 above described, to the respective pipe 131, 132, 133, or 134 to the heat regulating devices 7.

It will be apparent without detailed description that with lever 135 of each of the heat control valve devices 20 to 23 in the normal position shown in Figs. 1 and 7, diaphragm chamber 112 in the respective heat regulating device 7 will be open to the sump reservoir so that lever 119 of said regulating device may assume the position shown in Fig. 1. Movement of the lever 135 of the heat control device 20 to 23 out of the normal position will provide fluid in the diaphragm chamber 112 of the respective regulating devices 7 at a pressure corresponding to the degree of such movement; the maximum pressure being attained with the lever 135 in a position indicated in Figs. 1 and 7 by the dot and dash line bearing the numeral 385, to cause corresponding positioning of lever 119 of the regulating device 7. Any intermediate positioning of the lever 135 will result in corresponding positioning of the respective lever 119 of the heat regulating device 7, as will be seen.

Each of the engineer's blower control valve devices 24 to 27 comprises a cover 325 secured to the housing 28. Under the cover 325 the housing 28 has a chamber 326 which is constantly supplied with fluid under pressure from the supply passage 297 by way of a branch passage 327 and past a check valve 328 contained in said chamber. The chamber 326 also contains a supply valve 329 for controlling flow of fluid under pressure from said chamber to a chamber 330 provided partly in the housing 28 and partly in the cover 325, the chamber 330 being connected through a passage 331 and a cut-off valve device 332, like the cut-off valve device 301 to pipe 138, 139, 140, or 141 leading to the respective blower regulating device 8. A sleeve 323 is slidably mounted in a bore in the cover 325 in axial alignment with the supply valve 329 and carries a release valve 324 arranged opposite to the supply valve 329 in a chamber 333 which is connected by a passage 334 to passage 296 leading to return pipe 33. A spring 335 in chamber 326 bears against the check valve 328 and supply valve 329 for urging said valves to their closed positions. A spring 336 in chamber 330 bears against the sleeve 331 for urging same in the direction of the release valve 333. Movement of the sleeve 331 in this direction is limited by engagement with a stop 337. The cover 325 is provided with a groove encircling sleeve 323 and containing a ring seal 385 which contacts said sleeve to prevent leakage of fluid under pressure from chamber 330 to chamber 333 which is open to the sump reservoir 32.

A plunger 338 is slidably mounted in the cover with one end arranged to engage the release valve 324 while the opposite end extends into a chamber 339 this plunger being encircled by a ring seal 340 for preventing leakage of fluid under pressure from chamber 333 to chamber 339. In chamber 339 the end of plunger 338 engages the peripheral surface of a cam 341 which is secured to turn with a shaft 342 to which is connected a lever 142.

With the lever 142 in the position shown in the drawing the sleeve 323 will be urged by spring 336 into contact with stop 337 to allow seating of the supply valve 329 under the action of spring 335 and which also allows opening of release valve 337 by pressure of fluid from chamber 112 in the respective regulating device 8, which pressure is effective in a chamber 330, whereby the pressure of fluid in chamber 112 may reduce past said release valve into the sump reservoir 32.

The lever 142 is movable from the position just described to a position indicated by a dot and dash line 386; and upon such movement the cam 341 operates to move the plunger 338 in the direction of the supply valve 329. The initial movement of plunger 338 seats the release valve 324 against sleeve 323 in case it is not already seated, and then further movement causes said valve to act to move the sleeve 323 against spring 336 bringing the stem of the release valve 324 into contact with that of the supply valve 329, so that the further movement of plunger 338 upon movement of the lever 142 to the position indicated by line 386 will then unseat the supply valve 329. Fluid under pressure will then flow past the supply valve to passage 331 and thence to diaphragm chamber 112 in the respective blower regulating device 8 to therein act on the diaphragm 111 to deflect same and move the lever 119 thereof from the position shown to another desired operating position. When the operator desires to return the lever 119 of the blower regulating device 8 to its normal position shown, he returns the lever 142 to the position shown in Fig. 6 to allow release of fluid under pressure from diaphragm chamber 112 to the sump reservoir. It will thus be seen that by operation of one or more of the engineer's blower control valve devices 24 to 27 the operator may cause individual operation of the respective blower regulating valve devices 8.

It will be noted that the blower control valve devices 24 to 27 are not self-lapping like the other engineer's and pilot's control valve devices, so that when the levers 142 thereof are in the positions indicated by lines 386, the full pressure of fluid in pipe 65 becomes effective in chambers 112 on the diaphragms of the regulating valve devices. This pressure is however limited by the pressure regulating valve device 224 to a degree such as 150 pounds in contrast to the relatively higher pressure such as 400 pounds in the supply reservoir 39 and 40, and the purpose of this is to avoid rupturing the diaphragm 111 in said regulating devices, as might occur if subjected to the higher pressure.

The spring chambers 113 in the blower regulating devices 8 are open to the sump reservoir 32 so that the pressure in said chambers will vary with that in said reservoirs. This, however, will have no effect upon the operation of these regulating devices since the pressure of fluid supplied to chamber 112 therein will always exceed the sump reservoir pressure and insure intended operation of the devices.

The pressure regulating device 224 associated with the engineer's control devices 11 to 14 and hereinbefore described is provided for limiting the differential of pressures on the diaphragms 111 in the blower regulating devices 8 as just described, and on diaphragms 243 in the several control transfer valve devices 241 in the engineer's control valve devices 11 to 14 and serves no other purpose. In this connection it may be pointed out that the diaphragms in the engineer's speed regulating valve devices 242 and in the mixture and heat regulating valve devices 18 to 23 do not require this protection since these diaphragms are never subject to fluid at the pressure in the supply reservoirs and may never be subjected to a differential in pressures exceeding a degree such as 150 pounds as limited by the control springs.

*Description—Figure 12*

In the control apparatus above described the ring seals 85, 98 and 116 are required in the speed regulating devices 5, and in the mixture, heat and blower regulating devices 6, 7, and 8 respectively, to prevent leakage of fluid under pressure to the atmosphere from the chambers therein which are open to the sump reservoir 32, and it is necessary that these chambers be connected to the sump reservoir in order that the effect of variations in pressure in the sump reservoir on the control diaphragms in the pilot's control valve device 10 and in the different engineer's control valve devices 11 to 14 and 16 to 23 be offset, and thus have no influence upon the adjustment of said regulating devices in response to operation of said control valve devices.

The ring seals 85, 98 and 116 in the regulating valve devices 5 to 8 and the pipes connecting said devices with the sump reservoir 32 in the apparatus above described, may be eliminated by use of a structure such as shown in Figs. 12 to 14 wherein sump reservoir pressure acting in the pilot's and engineer's control valve devices has no effect upon the pressure of fluid supplied by said control valve devices for controlling said regulating devices.

In Fig. 12 are shown only the speed, mixture, heat, and blower regulating devices for one engine, and the engineer's control valve devices, and pilot's control valve device, for the said regulating devices since it will be apparent from the apparatus hereinbefore described that the regulating devices and engineer's control devices may be multiplied for a greater number of engines in the same manner as shown in Fig. 1.

According to this modified structure and as shown in Fig. 12 the regulating devices 5 to 8 are disconnected from the sump reservoir, the sealing rings 85, 98, and 116 in said devices are omitted, and the chambers 82, 95, and 113 in said devices are opened to atmosphere in any desired manner such as by clearance space which, though not shown in the drawing, may exist between the operating stems 84, 97, and 115 and the bores in the casing through which said stems operate. The return pipe 33 is also disconnected from the sump reservoir 32 and connected to what may be called an auxiliary sump reservoir 350 which is connected to the sump reservoir 32 through a pipe containing a check valve 351. This check valve may be like the check valve 38 associated with the supply reservoir 37 and is arranged to allow flow of liquid under pressure from the auxiliary sump reservoir 350 to the sump reservoir 32 but to prevent flow in the opposite direction. Except when used fluid under pressure is returned to either the sump reservoir 32 or the auxiliary sump reservoir 350, the pressures therein will be substantially that of the atmosphere due to operation of the compressor 39, regardless of the altitude of the plane, as will be apparent.

When the flap control valve device 71 is operated to release fluid under pressure from pipe 70 to the sump reservoir 32 this pressure will increase the pressure in the sump reservoir to a relatively high degree such as 100 pounds as above described, and under this condition the check valve 351 acts to prevent flow of fluid under pressure from the reservoir 32 to the reservoir 350.

The purpose of the auxiliary sump reservoir 350 is to receive the used fluid under pressure from the regulating devices 5 to 8 and to provide for such reduction in pressure in said devices, at a time when the sump reservoir 32 is charged with fluid at a pressure which exceeds that in the auxiliary sump reservoir as to allow the springs 86 and 117 in said devices to return the parts thereof to their normal positions shown.

Preferably the volume of the auxiliary sump reservoir 350 is such as to provide for the pressure of fluid in the regulating devices 5 to 8 reducing to a degree such as ten pounds above atmospheric pressure at the maximum altitude at which the plane will operate, and the springs 86 and 117 in said devices are such as to ensure movement of the respective diaphragms to their normal positions shown in the drawings against such a pressure in the sump reservoir.

The release of fluid under pressure from the regulating devices 5 to 8 to the auxiliary sump reservoir 350 will seldom if ever occur at a time when a greater pressure exists in the sump reservoir 32 than in the reservoir 350, since such a condition can result only from unlikely, substantial simultaneous operation of the flap control valve device 71 to release fluid under pressure from pipe 70, and of the engineer's or pilot's control valve devices to release fluid under pressure from certain or all of the regulating devices 5 to 8. I therefore preferably use an auxiliary sump reservoir of a volume sufficient to allow the pressure of fluid in all, or even less than all of the devices 5 to 8, to be reduced to the degree above mentioned and required to insure movement of the parts of said devices to their normal positions by their respective springs, assuming said reservoir to be substantially at atmospheric pressure at the time said devices are connected to same.

An abnormal condition might arise where such a small auxiliary sump reservoir 350 would prevent obtaining the reduction in fluid pressure in the regulating devices 5, 6, 7, and 8 required to insure movement of the parts thereof to their normal position. This difficulty could be avoided by using a larger sump reservoir so as to save all of the compressed air released from the devices 5 to 8. The larger reservoir, however, is objectionable not only on account of its size, but also on account of its probable greater weight. More particularly, however, due to the rarity of the abnormal condition, I prefer to use the smaller auxiliary sump reservoir 350, and associate therewith a release valve device 352 arranged to prevent the pressure of fluid increasing in the smaller reservoir above the above mentioned chosen value, such as ten pounds, in excess of atmospheric pressure.

The release valve device 352 may comprise a check valve 353 controlling a vent to atmosphere from the auxiliary sump reservoir 350, and a spring 354 acting on said check valve to hold same seated unless the pressure in the reservoir tends to increase above the chosen value of 10 pounds in excess of atmospheric pressure. In case of such a tendency, the check valve will open against spring 354 and release all excess fluid from the reservoir and then subsequently close. By thus limiting the pressure increase in the auxiliary sump reservoir 350 to a definite degree in excess of atmospheric pressure, movement of the parts of the regulating devices 5 to 8 to their normal positions will be insured at all altitudes at which the plane may fly and under all other conditions.

The need for the auxiliary sump reservoir 350 and check valve 351 is due entirely to the fact that the pressure in sump reservoir 32 may at some time exceed that in the auxiliary sump reservoir 350 at a time when it is desired to release fluid under pressure from one or more of the regulating devices 5 to 8 as above mentioned. Such a condition will, however, seldom if ever occur and particularly due to the fact that all fluid released to the sump reservoir 32 will be quickly recompressed by the compressor 39 into the supply reservoirs. When the pressure in the sump reservoir 32 is reduced to below the pressure which may exist in the auxiliary sump reservoir 350, the compressor will draw fluid under pressure from both sump reservoirs and recompress same into the supply reservoirs and thereby reduce the pressure in the sump reservoirs, as will be apparent.

The use of the release valve device 352 and the relatively smaller auxiliary sump reservoir 350 with which it is associated, will result, if the release valve device 352 ever opens in a slight loss of fluid under pressure from the system. The release valve device 353 will however open only under rare combinations of conditions as above mentioned, and the relatively small amount of fluid under pressure which will therefore be lost over a period of time is considered preferable to the use of a larger and consequently a heavier auxiliary sump reservoir 350.

In the apparatus shown in Fig. 1, the pressure of fluid supplied by the engineer's control valve devices 11 to 14 upon operation of levers 276, varies in accordance with the pressure of fluid which might be effective in the sump reservoir 32, since sump reservoir pressure coacts with the controlling springs 270 to govern the pressure of fluid supplied. The same condition exists in the pilot's control valve device 10 and also in the engineer's control valve devices 16 to 23. Obviously, therefore, these control valve devices could not be used with the structure shown in Fig. 12 since sump reservoir pressure is not effective in the regulating devices 5, 6, and 7 of said structure to compensate for the effect of sump reservoir pressure on the pressure of fluid supplied by said control valve devices.

According to the structure shown in Fig. 12, I therefore, modify the engineer and pilot's control valve devices 10 and 11 to 14 respectively, so that the sump reservoir pressure has no influence upon the pressure of fluid supplied by said devices in response to operation by the pilot or engineer. This is accomplished in the engineer's control valve devices 11 to 14 by the use of a flexible diaphragm 356 of the same area and arranged opposite to the diaphragm 257 and connected at its center to the follower 261 which is connected to the diaphragm 257. The fluid pressure release passage 262 in this embodiment is connected to a chamber 357 formed between the two diaphragms and which is open to the sump passage 33. Chamber 259 at the opposite side of diaphragm 356 is open to the atmosphere. With this arrangement it will be seen that the pressure of fluid in the auxiliary sump reservoir 350 acting on diaphragm 257 is counterbalanced by the same pressure acting in the opposite direction on diaphragm 356, so that said pressure will have no effect upon pressure of fluid supplied by the valve device in response to operation of the engineer's operating lever 276.

In other words the pressure of fluid which will be supplied in any position of levers 276 of the engineer's speed control valve devices for controlling operation of the speed regulating devices 5 will be proportional to the pressure of the controlling springs 270 plus pressure of the atmosphere acting on diaphragms 356 and wholly independent of the pressure of fluid in the auxiliary sump reservoir 350. Atmospheric pressure however is also effective in the regulating devices 5, in this embodiment to oppose pressure of fluid supplied thereto by the engineer's control valve devices 11 and thus compensates for the effect of atmospheric pressure on diaphragm 356 in the control valve devices. Due to this, variations in atmospheric pressure encountered at different altitudes will have no effect on the positioning of the regulating device 5 for any position of the engineer's control levers 276.

The engineer's heater and mixture control valve devices 16 to 23 may be modified in the same manner as the speed control valve devices 11 to 14, that is, by the provision of an additional diaphragm 359 of the same area as and arranged opposite to the diaphragm 298, and connected centrally to the seat member 305 as shown in Figs. 13 and 14. The fluid pressure release passage 307 in these devices is connected to a chamber 360 between the two diaphragms which chamber is open to the sump reservoir by way of passages 304 or 320 while chamber 302 in the cover 299 at the opposite side of each diaphragm 359 is open to the atmosphere through a passage 361 to provide for control of the pressure of fluid in the mixture and heat regulating valve devices 6 and 7 independently of the pressure of fluid acting in the auxiliary sump reservoir 350 in the same manner as accomplished in the engineer's speed control devices 11 to 14.

The same result is obtained in the pilot's control valve device 10 but in a slightly different manner. In this device chamber 240 below the lower diaphragm 148 is disconnected from the sump return pipe 33 and opened to atmosphere. The sleeve 166 is provided with an annular groove 362 and the release passage 169a in plunger 167 is opened to said groove in all positions of the plunger. The groove 362 in turn is open to passage 162 which is connected to the sump reservoir 350. Above the annular groove 362 the sleeve 166 is provided with a groove encircling plunger 167 and containing a ring seal 363 having sealing contact with the peripheral surface of the plunger. Chamber 170 above the plunger 167 in this embodiment is open to the atmosphere by way of clearance space which may exist between the operating shaft 185 and bearing in the casing since the ring seal 192 around said shaft may be removed. With this structure it will thus be seen that the effect of pressure in the auxiliary sump reservoir 350 on operation of the device is neutralized so that the pressure of fluid supplied thereby for controlling operation of the speed regulating valve devices 5 will vary directly in accordance with the position of the operating lever 124 and thus be independent of the pressure of fluid in the auxiliary sump reservoir 350, the same as in the modified engineer's control valve devices above described.

In this modified structure of pilot's control valve device, a sealing ring 367 is provided around plunger 213 to prevent leakage of fluid under pressure from the auxiliary sump reservoir to atmosphere by way of passage 162 and thence past said plunger to chamber 190 and around shaft 188 to chamber 170.

The engineer's and pilot's control valve devices will, as before pointed out be located at different control stations within the fuselage of the plane. If the pressure in the fuselage effective on diaphragms 356, 359, and 148 in the engineer's and pilot's control valve devices is atmospheric pressure, the same as exists outside of the fuselage and is effective on the diaphragms of the regulating valve devices 5 to 8, the apparatus will operate as above described regardless of variations in atmospheric pressure which may exist at different altitudes. However, in case a plane equipped with this apparatus is designed for flying at altitudes requiring an increase in pressure in the engineer's and pilot's compartment above that of the atmosphere outside of the fuselage, then such increased pressure effective on these diaphragms would act to cause an increase in pressure of fluid supplied in any position of the engineer's and pilot's control valve devices by a degree equal to the difference between atmospheric pressure outside of the fuselage and the pressure within the fuselage. To avoid this undesired result, pipes 358 and 364 may be connected to diaphragm chambers 259 and 302 respectively in the engineer's control valve devices and be lead through the fuselage of the plane to the atmosphere outside same, and the ring seals 322 and 273 around the operating stems of these devices would under such a condition be employed to prevent leakage of fluid under pressure from within the fuselage to the atmosphere through these pipes.

Further, in the pilot's control valve device 10 the ring seal 192 would be used around the operating shaft 188, the chamber 170 would be connected to diaphragm chamber 240 by a passage 365 and these chambers in turn connected by a pipe 366 to the outside of the fuselage. With the control diaphragms in the engineer's control valve devices, and diaphragm 148 and the opposite end of plunger 167 in the pilot's control valve device 10 thus subject to atmospheric pressure outside of the fuselage of the plane, which pressure is the same as effective in the regulating valve devices 5 to 8, it will be readily apparent that the pressure of fluid supplied by any of these control valve devices will be independent of the pressure within the plane's fuselage and will vary directly in accordance with the positioning of the respective operating lever.

Summary

From the above description it will now be seen that the improved control apparatus for a plurality of engines such as may be employed for propelling an airplane, provides for control of the speed of all engines as a unit by the pilot on the plane. While the engines are under the control of the pilot, the engineer on the plane may effect slight changes in speed of any one or more of the engines in order to synchronize the engines and the engineer is also provided with arrangements whereby he may govern the fuel mixture to the engine, the temperature of said mixture, and the operation of a blower or super charger. The pilot may, at will, take over from the engineer the control of speed of the several engines as a unit, and, at will, may transfer this control back to the engineer who is provided with control devices whereby he may control the speed of each individual engine as in case of emergency or during warm up periods or for the purpose of taxiing the plane. While the engines are under control of the pilot, the engineer may cut out any engine in case of trouble and, if the trouble is subsequently corrected, he may transfer the control of this engine back to the pilot.

The fluid control system is what may be called a closed system in that all air or fluid under pressure used from the supply reservoirs for operating the various devices is returned to a sump reservoir for recompression by the air compressor back into the supply reservoirs. In one embodiment all of the controlling valve devices and regulating valve device are subject to pressure in the sump reservoir which may vary from a atmospheric pressure to a relatively high degree, but this pressure has no effect upon adjustment of any of the regulating devices since its effect therein is compensated for by its effect in the engineer's and pilot's control valve devices. In the other embodiment of the invention the regulating devices are not subject to pressure of fluid in the sump reservoir but instead are subject to atmospheric pressure, while the control valve devices, which still are subject to sump reservoir pressure, are provided with means to compensate for such pressure so as to render said control valve devices effective to provide fluid at a pressure independent of that in the sump reservoir for controlling the operation of the regulating devices. In this latter structure fluid under pressure is not released from the regulating devices to the sump reservoir as in the structure shown in Fig. 1, but instead an auxiliary sump reservoir having a release valve device associated therewith is provided to insure movement of the parts of the regulating devices to their normal position upon release of fluid under pressure therefrom and regardless of the pressure of fluid in the main sump reservoir and even if a plane is flying at a high altitude where the atmospheric pressure is relatively low.

The supply of fluid under pressure to the apparatus for controlling the regulating devices constitutes a plurality of sources so that in case of failure of one source the apparatus may be controlled by fluid pressure from the other source to thereby minimize the possibility of failure of control of the regulating devices. In order to further minimize the possibility of failure of the apparatus cut off valve devices are provided in the various control pipes thereof so that in case of breakage of one of said pipes loss of the fluid under pressure supply through the break will be prevented to thereby insure against loss of fluid from other parts of the apparatus and loss of control of all regulating devices.

Having now described my invention, what I claim as new and desire to secure by Letters Patent, is:

1. In combination, a device to be controlled, two control means each for individually controlling said device, interlock means operable by fluid under pressure to render one of said control means non-operable to control said device and upon release of said fluid under pressure operable to control said device, the other control means comprising a lever having a certain zone of movement, and means controlled by said lever upon movement in said zone for controlling said device, said lever also having a non-control position outside of said zone, and said other control means further comprising means controlled by said lever and operable with said lever in said zone to supply fluid under pressure to operate said interlock means and operable with said lever in said non-control position to release fluid under pressure from said interlock means.

2. In combination, a device adjustable in accordance with variations in pressure of fluid in a chamber within a certain range of variations, two control means each comprising a lever having a zone of movement and means controlled by said lever operable upon movement in said zone for providing said range of variations in fluid pressure in said chamber, interlock means operable by fluid under pressure to render one of said control means non-operable to vary the pressure of fluid in said chamber, and operable upon the release of such pressure to render said one control means operable to vary the pressure of fluid in said chamber, the lever of the other control means having a non-control position outside of its range of movement, and means controlled solely by the last named lever and operable upon movement of the last named lever to its non-control position to release fluid under pressure from said interlock means, and operative upon movement out of said non-control position to supply fluid under pressure to said interlock means.

3. In combination, a device adjustable in accordance with variations in pressure of fluid in a chamber within a certain range of variations, two control means each comprising a lever having a certain zone of movement and means controlled by said lever upon movement in said zone for providing said range of variations in pressure of fluid in said chamber, each lever having a position at one end of its zone for effecting operation of the respective means to provide a certain minimum pressure of fluid in said chamber, the lever of one of said control means having a non-control position outside of its range, and said one control means being so constructed as to render its lever movable out of its zone of movement to said non-control position only from the respective first named position, and means controlled by and operable upon movement of the last named lever to said non-control position to render the other control means effective to provide said range of pressure variations in said chamber and upon movement out of said non-control position to render said other control means ineffective to provide said range of pressure variations in said chamber.

4. In combination, a device adjustable by pressure of fluid, two manual control means each comprising a lever and valve means operable by said lever to vary said pressure of fluid, each lever having a certain position to effect operation of the respective valve means to provide a relatively low pressure of fluid in said device and being movable in one direction therefrom to effect operation of the respective valve means for increasing such pressure, the lever of one of said manual control means being movable in another direction from said position, and means operable upon movement of the lever of said one manual control means in said other direction to effect movement of the lever of the other manual control means to its said certain position.

5. In combination, a regulating device adjustable in accordance with variations in pressure of fluid in a chamber, two control valve means individually operative for controlling the pressure of fluid in said chamber, each control valve means comprising a lever having a zone of movement and being operable with said lever in a certain position in said zone to provide a certain minimum pressure of fluid in said chamber and being operable upon movement of said lever in said zone away from said certain position for increasing the pressure of fluid in said chamber in accordance with the extent of movement from said certain position, the lever of one of said two control valve means being also movable from said certain position out of said zone to a different position, a valve device for controlling two communications, one between each of said two valve means and said chamber, and being operable upon opening either one of said communications to close the other communication, and means controlled by and operable upon movement of the last named lever to its said different position, to effect operation of said valve device to open the communication between said chamber and the other control valve means and operable upon movement of said last named lever out of its said different position, to effect operation of said valve device to open the communication between said chamber and the said one control valve means.

6. In combination, a regulating device adjustable in accordance with variations in pressure of fluid in a chamber, two control valve means individually operative for controlling the pressure of fluid in said chamber, each control valve means comprising a lever having a zone of movement and being operable with said lever in a certain position in said zone to provide a certain minimum pressure of fluid in said chamber and being operable upon movement of said lever in said zone away from said certain position for increasing the pressure of fluid in said chamber in accordance with the extent of movement from said certain position, the lever of one of said two control valve means being also movable from said certain position out of said zone to a different position, a valve device for controlling two communications, one between each of said two valve means and said chamber, and being operable upon opening either one of said communications to close the other communication, means operable upon movement of the last named lever to its said different position, to effect operation of said valve device to open the communication between said chamber and the other control valve means and operable upon movement of said last named lever out of its said different position, to effect operation of said valve device to open the communication between said chamber and the said one control valve means, and other means operable upon movement of the lever of said one control valve means to its said different position to effect movement of the lever of said other valve means to its said certain position.

7. In combination, a device to be controlled, two control means each for controlling said device, means operative, upon operation of one of said control means to control said device, to render said device non-controllable by the other control means, and manually operable means associated with the said other control means and operative independently thereof and with said one control means controlling said device to transfer the control of said device from said one control means to said other control means.

8. In combination, a device to be controlled, two control means each for individually controlling said device, means operable by fluid under pressure to render said device non-controllable by one of said control means and operable upon the release of fluid under pressure to render said device controllable by said one control means, the other control means comprising a lever having a zone of movement for controlling operation of said other control means to control said device and having a non-control position outside of said zone, means operable upon movement of said lever out of said non-control position to supply fluid under pressure to the first named means and operable upon movement to said non-control position to release fluid under pressure from said first named means, and a manually operable valve associated with said one control means operable to release fluid under pressure from said first named means with said lever out of said non-control position.

9. In combination, a device adjustable in accordance with pressure of fluid in a chamber, two control means each operative to supply fluid under pressure, a control valve device movable by fluid under pressure to one position for opening communication between one of said control means and said chamber and for closing communication between the other of said control means and said chamber, and movable to a second position upon the release of such fluid pressure for opening communication between said other control means and chamber and for closing communication between said one control means and chamber to thereby render either said one or the said other control means effective to control the pressure of fluid in said chamber, one of said control means comprising a lever and means operable by said lever in one position thereof for venting said chamber and operable by said lever upon movement from said one position to supply fluid under pressure to said chamber and being also movable from said one position to a different position, means controlled by said lever and conditioned thereby in said one position and upon movement to supply fluid under pressure to said chamber to also supply fluid under pressure to said control valve device to urge same to its said one position and operable upon movement of said lever to said different position to release fluid under pressure from said control valve device, and a valve associated with the other control means normally opening communication between said one control means and said control valve device and operative to close such communication and release fluid under pressure from said control valve device.

10. In combination, a device adjustable in accordance with the degree of a variable force, a first and a second control means each operable to provide any degree of force within a certain range for controlling said device, said first control means comprising a control member and regulating means operable by said member to regulate the degree of such force for controlling said device, said member being movable to a non-control position for effecting operation of said regulating means to dissipate such force, means controlled by said first control means and operable with its control member in said non-control position to render said second control means operable to provide said range of variation in force for controlling said device, and means operable upon movement of said control member out of said non-control position to limit the variation in said force providable by said second control means to only a portion of said range.

11. In combination, a device adjustable in accordance with the cooperative effect of fluid under pressure in a first chamber and in a second chamber, two control valve means each operable to supply fluid at various degrees of pressure and to release such fluid, a selector valve having one position for connecting one of said control valve means to said first chamber and the other control valve means to said second chamber and having a second position for disconnecting said first chamber from said one control valve means and for connecting same to said other control valve means, and means controlled by said one control valve means and operable upon operation thereof to supply fluid under pressure, to effect movement of said selector valve to said one position and operable to effect movement of said selector valve to said second position in a condition of said one valve means for releasing fluid under pressure.

12. In combination, a device adjustable in accordance with the cooperative effect of fluid under pressure in a first chamber and in a second chamber, two control valve means each operable to supply fluid at various degrees of pressure and to release such fluid, a selector valve having two different positions, said selector valve comprising means effective in one position of said two positions for connecting one of said control valve means to said first chamber and the other control valve means to said second chamber and further comprising means effective in the other of said two positions for disconnecting said first chamber from said one control valve means and for connecting same to said other control valve means, selector valve control means for controlling the positioning of said selector valve means controlled by said one control valve means and operable upon operation thereof to supply fluid under pressure to effect operation of said selector valve control means to effect movement of said selector valve to said one position and operable to effect operation of said selector valve control means to effect movement of said selector valve to said second position upon operation of said one control valve means for releasing fluid under pressure, a piston operable by fluid under pressure to effect operation of said other control valve means to release fluid under pressure, said piston being operable upon release of fluid pressure to render said other control valve means operable to supply fluid under pressure, said selector valve being operable upon movement to said second position to supply fluid under pressure to actuate said piston, and means for releasing the fluid pressure on said piston subsequent to actuation thereof.

13. In combination, adjustable means, two control devices each comprising a lever operable upon movement from a certain position to effect operation of the respective control device for providing a certain range of adjustments of said adjustable means, the lever of one of said control devices having a non-control position, actuating means operable upon movement of said lever of said one control device to said non-control position to effect movement of the lever of the other control device in the direction of its said certain postition, and means operable upon termination of said operation of said actuating means to render said last named lever and the respective control device effective to provide said certain adjustments.

14. In combination, a plurality of devices to be controlled, a control means at one station operable to control said devices, a plurality of individual control means at another station one for controlling each of said devices, selector means operable to either render all of said devices controllable as a unit by said control means at said one station and non-controllable by the control means at said other station, or controllable individually by said control means at said other station and non-controllable by said control means at said one station, and means controlled by said control means at said one station operable to control said operation of said selector means.

15. In combination, a plurality of devices to be controlled, a control means at one station operable to control said devices, a plurality of individual control means at another station, one for controlling each of said devices, selector means operable to either render all of said devices controllable as a unit by said control means at said one station, or controllable individually by said control means at said other station, means controlled by said control means at said one station operable to control said operation of said selector means, and a cutout device at said other station operable with said devices arranged for control by said control means at said one station to render one of said devices non-controllable by said control means at said one station.

16. In combination, a plurality of devices to be controlled, a control means at one station operable to provide a certain control of all of said devices, a plurality of individual control means at another station, one for controlling each of said devices, and each operable to provide said certain control of the respective device, said control means at said one station comprising a lever having a certain zone of movement to effect operation of the respective control means for controlling said devices, said lever being movable out of said zone to a non-control position, and means controlled by and operative with said lever in said non-control position to render said control means in said other station operable to provide said certain control of said devices and with said lever out of said non-control position non-operable to provide said certain control.

17. In combination, a plurality of force controlled devices adjustable according to variations in the degree of said force, a control means at one station operative to adjust simultaneously the control force at all of said devices and comprising a lever having a certain zone of movement and means controlled by said lever operable to provide a certain range of variation in the degree of said control force from a minimum at one end of said zone to a maximum degree at the opposite end of said zone said lever being movable from said one end of said zone to a non-control position outside of said zone, a plurality of individually operable control means at another station, one for each of said devices, and each being operable to provide at the respective device a control force of any desired degree within said range, means conditioned upon movement of said lever to said non-control position to render said plurality of control means at said other station operable to provide at the respective devices any desired force within said range, and means effective upon movement of said lever out of said non-control position to limit the force providable by said plurality of control means at the respective devices to a degree less than said maximum.

18. In combination, a plurality of fluid controlled devices adjustable in accordance with the pressure of such fluid, a control means at one station comprising a lever and means operable by said lever to provide fluid at any desired pressure within a certain range, said lever having a non-control position and being operable therein to effect operation of said control means for providing a certain minimum pressure of fluid, a plurality of individual control means at another station, one for each of said devices, and each being operable to provide fluid at any desired pressure within said range, a selector valve associated with each of said plurality of control means and having one position for rendering the respective fluid pressure controlled device controllable by pressure of fluid supplied by said control means at said one station and having a second position for rendering said respective fluid pressure controlled device controllable by pressure of fluid supplied by the respective control means at said other station, and means operable upon movement of said lever to said non-control position to effect movement of all of said selector valves to said second position, and upon movement out of said non-control position to effect movement of all of said selector valves to said one position.

19. In combination, a plurality of fluid controlled devices adjustable in accordance with the pressure of such fluid, a control means at one station comprising a lever and means operable by said lever to provide fluid at any desired pressure within a certain range, said lever having a non-control position and being operable therein to effect operation of said control means for providing a certain minimum pressure of fluid, a plurality of individual control means at another station, one for each of said devices and each being operable to provide fluid at any desired pressure within said range, a selector valve associated with each of said plurality of control means and having one position for rendering the respective fluid pressure controlled device controllable by pressure of fluid supplied by said control means at said one station and having a second position for rendering said device controllable by pressure of fluid supplied by the respective control means at said other station, means operable upon movement of said lever to said non-control position to effect movement of all of said selector valves to said second position and upon movement out of said non-control position to effect movement of all of said selector valves to said one position, and manually adjustable means associated with each of said selector valves and having one position providing for control of the respective selector valve by said lever and another position for effecting movement of the selector valve to said second position with said lever out of said non-control position.

20. In combination, a plurality of fluid pressure controlled regulating devices each comprising a member adjustable out of a certain position by the respective device in accordance with the pressure of fluid controlling said device, a fluid pressure control device at one station for regulating the pressure of fluid in all of said regulating devices simultaneously and comprising a lever having one position for effecting operation of said fluid pressure control device to provide fluid at a pressure to effect adjustment of said regulating devices to their said certain position, said lever being movable from said one position to effect operation of said fluid pressure control device for supplying fluid at a pressure proportional to the extent of such movement, said lever being also movable from said one position to a non-control position, a plurality of fluid pressure control devices at another station, one for each of said regulating devices, and each individually operative for regulating pressure of fluid in the respective regulating device, means operable upon movement of said lever to said non-control position to render said plurality of fluid pressure control devices effective to adjust the pressure of fluid in the respective regulating devices, and upon movement of said lever out of said non-control position, to render said fluid pressure control device at said one station effective to adjust the pressure of fluid in all of said regulating devices in unison, said means being also operable with said lever out of said non-control position to render said plurality of fluid pressure control devices effective to individually adjust the pressure of fluid in the respective regulating devices, and means operative to limit the range of adjustment of said regulating devices by said plurality of fluid pressure control devices with said lever out of said non-control position to a fraction of the range provided by said fluid pressure control device at said one station.

21. In combination, a device adjustable in accordance with variations in the degree of a control force, a first control means adapted to control said device and adjustable to provide any degree of force from a minimum degree to a maximum degree within a certain range for adjusting said device, a second control means effective at all times to control said device and adjustable to provide any degree of force within substantially said range for adjusting said device, limiting means operable to limit the degree of force providable by said second control means for adjusting said device to a fraction of the maximum degree and means operable to selectively render said first control means and said limiting means either both effective at the same time or both ineffective at the same time.

22. In combination, a device adjustable in accordance with the cooperative effect of pressure of fluid in a first chamber and in a second chamber, one manually operable self-lapping control valve means adjustable to vary pressure of fluid in said first chamber, a second manually operable self-lapping control valve means adjustable to vary pressure of fluid in either one of said chambers, valve means having one position for establishing a first communication between said one control valve means and said first chamber, for rendering said one control valve means effective to control the pressure of fluid in said first chamber and for also establishing a second communication between said second control means and said second chamber for rendering said second control valve means effective to control pressure of fluid in said second chamber, said valve means having another position for closing the first and second communications and for establishing a third communication between said second control valve means and said first chamber for rendering said second control means effective to control pressure of fluid in said first chamber, said valve means in said one position closing said third communication, and means for controlling the positioning of said valve means.

23. In combination, a plurality of fluid pressure adjustable devices, one control means operable to adjust pressure of fluid for controlling all of said devices, a plurality of other control means, one for each of said adjustable devices, and individually operable to adjust pressure of fluid for controlling the respective adjustable devices, selector means having one position for rendering said one control means effective to adjust the pressure of fluid in all of said adjustable devices simultaneously, and for at the same time rendering each of said plurality of control means effective to also adjust pressure of fluid in the respective adjustable device, said selector means having a second position for rendering said one control means ineffective to control pressure of fluid in said adjustable devices and for rendering said plurality of control means effective to individually adjust the pressure of fluid in the respective adjustable devices, and means operative to control the positioning of said selector means.

24. A fluid pressure control system for regulating a device to be controlled, comprising a plurality of fluid pressure adjustable regulating means associated with said device and cooperative to control regulation of said device, a manually operable control valve device at one station operative to supply fluid under pressure to and to release fluid under pressure from one of said regulating means for effecting adjustments thereof, a manually operative control valve device at another station operative to supply fluid under pressure to and release fluid under pressure from another of said regulating means for effecting adjustments thereof, and another manually operable control valve device at said other station also operable to supply fluid under pressure to and to release fluid under pressure from the said one regulating means for controlling the adjustments thereof.

25. In combination, an adjustable device, a first control means and a second control means each individually operative to vary adjustment of said device, a first lever for controlling operation of said first control means, a second lever for controlling operation of said second control means, each lever having a certain zone of movement for controlling the respective control means and having a certain position in said zone to effect operation of the respective control means to provide a chosen adjustment of said device, said first lever being capable of movement out of its said certain zone of movement, transfer means controlled by said first lever and operable with said first lever in its said certain zone of movement to render said second control means ineffective to control said device and operable upon movement of said first lever out of its said certain zone of movement to render said second control means effective to control said device, said transfer means comprising means operable to effect movement of said second lever to said certain position in its certain zone of movement upon movement of said first lever out of its said certain zone of movement, and means operable upon movement of said second lever to said certain position in its said certain zone of movement to free said second lever for movement in its said certain zone of movement.

26. In combination, a fluid pressure controlled regulating device adjustable in accordance with the pressure of such fluid, two control devices each comprising a lever having a certain zone of movement and means controlled by said lever upon movement in said zone for providing fluid in said regulating device at a pressure proportional to the extent of movement from a certain position at one end of the said zone, the lever of one of said control devices being movable from its said certain position to a non-control position outside of its said certain zone of movement, actuating means conditioned in response to movement of the last named lever to said non-control position to effect movement of the other lever through its said certain zone of movement in the direction of the respective certain position, and means operable upon movement of the last named lever to the respective certain position by said actuating means to free said last named lever for movement in its said certain zone.

27. In combination, a plurality of devices to be controlled, a control means at one station operable to provide, simultaneously, a certain control of all of said devices, a plurality of individual control means at another station, one for each of said devices, operable to provide said certain control of the respective devices, selector means conditionable to either render all of said devices controllable as a unit by said control means at said one station or controllable individually by said control means at said other station, means for controlling said selector means controlled by pressure of fluid in a chamber and operable upon supply of fluid under pressure to said chamber to effect the first named conditioning of said selector means and operable upon release of fluid under pressure from said chamber to effect the second named conditioning of said selector means, a source of fluid under pressure, and means operable by said control means at said one control station to at one time open communication between said chamber and source of fluid under pressure and to at another time close said communication and release fluid under pressure from said chamber.

28. In combination, a device to be controlled, a first control means for controlling said device, a second control means for controlling said device, transfer means having one position for connecting said device for control to said second control means and having a second position for interrupting the control connection between said device and said second control means, said first control means comprising a lever having a control zone of movement and means controlled by movement of said lever in said zone for controlling said device, said lever also having a non-control position outside of said zone, means operable by said lever in said zone to effect movement of said transfer means to its said second position, and means operable to effect movement of said transfer means to its said one position in said non-control position of said lever.

29. In combination, a plurality of fluid pressure adjustable control devices, control means at one station comprising a lever and means operable by said lever to provide fluid at any desired pressure within a certain range, said lever having a non-control position to effect operation of said means for providing a certain minimum pressure of fluid, a plurality of control means at another station, one for each of said control devices, for providing fluid at any desired pressure within said range, and each comprising valve means for controlling such pressure and a lever having a zone of movement and operative at one end of said zone to effect operation of said valve means to provide fluid at a minimum pressure and at the opposite end of said zone at a maximum pressure, a selector valve associated with each of said plurality of control means having two different positions and comprising means effective in one of said two positions for rendering the respective control device controllable by pressure of fluid supplied by said control means at said one station and further comprising means effective in the other of said two positions for rendering said respective control device controllable by pressure of fluid supplied by the respective control means at said other station, actuating means for moving each selector valve to its different positions, means operable in said non-control position of said lever to effect operation of all of said actuating means to move the respective selector valves to their said second position and operable upon movement of said lever out of said non-control position to effect operation of all of said actuating means to move the respective selector valves to their said one position, piston means associated with each of said plurality of control means and operable by fluid under pressure to effect movement of the respective lever to the said one end of the respective zone, each selector valve further comprising means operable in its said second position to supply fluid under pressure to the respective piston means, and means operative to release fluid pressure from said piston means upon movement of the respective lever to the said one end of its zone.

30. In combination, a plurality of regulating devices each having a first control chamber and a second control chamber and comprising means adjustable in accordance with pressure of fluid in said first and second chambers, a control means at one station comprising a lever having a zone of movement and means controlled by said lever and operable with said lever at one end of said zone to provide fluid at a certain minimum pressure and operable upon movement of said lever from said one end of said zone to supply fluid at a pressure in proportion to the extent of such movement, said lever being movable from said one end of said zone to a non-control position, a plurality of individual control means at another station one for each of said regulating devices and each comprising a lever and valve means controlled thereby and operable to provide any desired pressure of fluid, a selector valve associated with each of said plurality of control means having two different positions and comprising means effective in one of said two positions for rendering said control means at said one station operable to control the pressure of fluid in said first control chamber of the respective regulating device and further comprising means effective in said one position for rendering the respective one of said plurality of control means effective to control the pressure in said second control chamber of the respective regulating device, each selector valve further comprising means effective in its second position for rendering said control means at said one station ineffective to control said regulating devices and further comprising means effective in said second position for rendering the respective one of said control means at said other station effective to control the pressure in said first control chamber of the respective regulating device, actuating means operable to effect movement of each of said selector valves to its different positions, means controlled by said lever at said one control station for controlling all of said actuating means and operable upon movement of the lever to said non-control position to effect operation of said actuating means to effect movement of said selector valves to their said second position and upon movement of the lever out of said non-control position to effect operation of said actuating means to effect movement of said selector valves to their said one position, a piston associated with each of said plurality of control means operable by fluid under pressure to actuate the respective lever to reduce the pressure of fluid supplied thereby to a minimum, each of said selector valves further comprising means effective in its second position to supply fluid under pressure to the respective piston, and means for relieving said piston of pressure of fluid after actuation of the respective lever thereby.

RANKIN J. BUSH.

REFERENCES CITED

The following references are of record in the file of this patent:

UNITED STATES PATENTS

| Number | Name | Date |
|---|---|---|
| 268,210 | Farley | Nov. 28, 1882 |
| 767,027 | Wilkinson | Aug. 9, 1904 |
| 821,867 | Farmer | May 29, 1906 |
| 1,149,152 | Canion | Aug. 3, 1915 |
| 1,854,893 | Farrar | Apr. 19, 1932 |
| 1,935,004 | Winther | Nov. 14, 1933 |
| 2,049,078 | Otis | July 28, 1936 |
| 2,068,130 | Harrison | Jan. 19, 1937 |
| 2,081,946 | Martin | June 1, 1937 |
| 2,098,914 | Gorrie | Nov. 9, 1937 |
| 2,103,274 | Sanford | Dec. 28, 1937 |
| 2,168,701 | Buttner | Aug. 8, 1939 |
| 2,206,163 | Clench | July 2, 1940 |
| 2,254,890 | Gardiner | Sept. 2, 1941 |
| 2,261,670 | Bailey | Nov. 4, 1941 |
| 2,275,255 | Freeman | Mar. 3, 1942 |
| 2,281,138 | Christensen | Apr. 28, 1942 |
| 2,282,194 | Lamond | May 5, 1942 |
| 2,289,654 | Keel et al. | July 14, 1942 |
| 2,306,060 | Jacobsson | Dec. 22, 1942 |
| 2,317,846 | Campbell | Apr. 27, 1943 |

OTHER REFERENCES

Handbook of Instruction (Maintenance), Boeing Stratoliner, Model S-307, Figure 40. Copyrighted 1940.